United States Patent
Kobayashi

(10) Patent No.: US 7,679,660 B2
(45) Date of Patent: Mar. 16, 2010

(54) SOLID-STATE IMAGE PICKUP APPARATUS FOR COMPENSATING FOR DETERIORATION IN HORIZONTAL CHARGE TRANSFER EFFICIENCY

(75) Inventor: Hirokazu Kobayashi, Asaka (JP)

(73) Assignee: Fujifilm Corporation, Tokyo (JP)

( * ) Notice: Subject to any disclaimer, the term of this patent is extended or adjusted under 35 U.S.C. 154(b) by 978 days.

(21) Appl. No.: 11/432,524

(22) Filed: May 12, 2006

(65) Prior Publication Data

US 2006/0256218 A1    Nov. 16, 2006

(30) Foreign Application Priority Data

May 16, 2005    (JP)    ............... 2005-142186

(51) Int. Cl.
*H04N 3/14*    (2006.01)
*H04N 5/228*    (2006.01)

(52) U.S. Cl. .................. 348/294; 348/222.1
(58) Field of Classification Search .................. 348/294
See application file for complete search history.

(56) References Cited

U.S. PATENT DOCUMENTS 6,803,960 B2 * 10/2004 Shepherd et al. ............ 348/315
7,453,499 B2 * 11/2008 Honda et al. ............ 348/223.1
2005/0036040 A1    2/2005 Honda et al.
2007/0040916 A1 * 2/2007 Ashida et al. ............ 348/222.1

FOREIGN PATENT DOCUMENTS

JP    2004-327722 A    11/2004

\* cited by examiner

*Primary Examiner*—Lin Ye
*Assistant Examiner*—Amy Hsu
(74) *Attorney, Agent, or Firm*—Birch, Stewart, Kolasch & Birch, LLP

(57) ABSTRACT

An solid-state image pickup apparatus compensates for deterioration in horizontal transfer efficiency conspicuous in an image captured in, e.g. a high ISO sensitivity mode. A horizontal transfer efficiency calculator in a transfer efficiency compensator of a signal processor calculates in advance a local horizontal transfer efficiency for signal charge transfer in a concentrating portion of an image sensor, for each value of ISO sensitivity, to store a resultant value. The signal processor processes a digital image signal representing a photographed subject. In main shooting with a value of ISO sensitivity for image pickup set, a subject field is captured, and a horizontal transfer efficiency detector detects a local horizontal transfer efficiency consistent with the value of ISO sensitivity for image pickup. A horizontal transfer efficiency corrector corrects a digital image signal based on the consistent local horizontal transfer efficiency.

40 Claims, 9 Drawing Sheets

SOLID-STATE IMAGE PICKUP APPARATUS FOR COMPENSATING FOR DETERIORATION IN HORIZONTAL CHARGE TRANSFER EFFICIENCY

BACKGROUND OF THE INVENTION

1. Field of the Invention

The present invention relates to a solid-state image pickup apparatus and an image correcting method capable of compensating for the deterioration of horizontal charge transfer efficiency conspicuous in an image output in, e.g. a high ISO (International Standards Organization) sensitivity mode.

2. Description of the Background Art

A solid-state image pickup apparatus of the type operable in a high ISO sensitivity mode is conventional. With this type of image pickup apparatus one of the problems is that the level of signals output from an image sensor after picking up an image decreases with the image sensor having an increased number of pixels and a decreased size of the individual pixel. Another problem is that during the horizontal transfer of signal charges in the image sensor the amounts of signal charges received from the preceding pixel and of signal charges left in the following pixel have the characteristic curve thereof upwardly convex with respect to the signal level, so that the ratio of a transfer remainder to the original signal in the form of an offset increases to critically degrade colors. This is particularly conspicuous when the amount of signal charges to be transferred is smaller.

Usually, the image sensor is made up of an image sensing surface or photosensitive array, a horizontal transfer path, a floating diffusion amplifier (FDA) and an output circuit. Signal charges of respective pixels are vertically transferred to the horizontal transfer path, which horizontally transfers the signal charges of each row to a concentrating portion. Similarly to the horizontal transfer path, the concentrating portion sequentially transfers the signal charges of each row in the horizontal direction.

However, the horizontal transfer path and the concentrating portion may have lattice defects caused in the course of the manufacture process for the image sensors. The number and the location of the lattice defects are varied from one image sensor to another. Due to these lattice defects, the horizontal transfer path and the concentrating portion sometimes leave over signal charges in the course of the horizontal transfer, thus deteriorating the horizontal transfer efficiency.

When an image sensing surface which has its pixels or photosensitive cells arrayed in a so-called "honeycomb" pattern generates signal charges representing the gray incident light and transfers them to the horizontal transfer path, specifically, the signal charges of a row of red (R) and blue (B) pixels on the horizontal transfer path, the R pixel data 302 and the B pixel data 304 are approximately equal to each other in signal level, as seen from FIG. 6. Thus, in this case, a scrutinization of the relationship of correspondence between the signal quantity of a given pixel and the remainder signal quantity to the next pixel, that is, the horizontal transfer efficiency 310, may reveal that the remainder quantity from the R pixel to the following pixel is approximately equal to that from the B pixel to the following pixel, as understood from FIG. 7.

By contrast, when signal charges of a row of R and B pixels, representing the red incident light, are generated and transferred on the horizontal transfer path, the R pixel data 322 are appreciably higher than the B pixel data 324 in signal level, as understood from FIG. 8. Thus, if the horizontal transfer efficiency 330 is scrutinized in this case, the remainder quantity 332 from the R pixel to the next pixel is larger than that from the B pixel data to the next pixel, as seen from FIG. 9.

Thus, the adverse effect of deterioration in the horizontal transfer efficiency, that is, the remainder quantity with respect to the signal quantity is generally higher for a subject with chromatic color to be shot, depending on how the pixels are arrayed in the horizontal direction. It may be surmised that signal charges of a row of green (G) pixels are of the same level and hence are not affected by deterioration in the horizontal transfer efficiency.

Meanwhile, in an electronic camera, disclosed in U.S. patent application publication No. 2005/0036040 A1, the R/G ratio and the B/G ratio are acquired as reference image sensing conditions, from the output signal of the image sensor, and the status of mixed colors is verified responsive to the reference image sensing conditions to decide the gain in the gain control. The gain may be determined from one color signal to another.

In light of the above, Japanese patent laid-open publication No. 2004-327722 discloses a solid-state image sensor manufactured in such a way that, in the manufacturing process, image data A and B are output from two kinds of photodiodes having the storage capacities of signal charge thereof different from each other, mean values $A_1$ and $B_1$ of differences between signals output from two nearby pixels around a concentrating portion are calculated, mean values $A_2$ and $B_2$ of differences of signals output from two nearby pixels at a portion remote from the concentrating portion are calculated, a ratio $T=A_1/B_1$ is used to determine whether or not the defect of the concentrating portion is acceptable, and then the ratio T and a ratio $U=A_2/B_2$ are used to determine whether or not the defect of the horizontal transfer path is acceptable.

Meanwhile, when the signal quantity generated in response to a light volume incident on the image sensing surface is scrutinized, it is seen that the more the incident light volume, that is, the lower the value of ISO sensitivity, the more becomes the signal quantity, as shown in FIG. 10, whereas the lesser the incident light volume, that is, the higher the value of ISO sensitivity, the lesser becomes the signal quantity.

More specifically, if the relationship of the remainder quantity with respect to the signal quantity, that is, the horizontal transfer efficiency, is scrutinized, as seen from FIG. 11, then it may be seen that, since the remainder quantity has its characteristic curve 340 upwardly convex, the remainder quantity ΔSa is decreased for a larger signal quantity, that is, for the lower-value of ISO sensitivity, while the remainder quantity ΔSb is increased for a smaller signal quantity, that is, for the higher value of ISO sensitivity. Thus, the horizontal transfer efficiency is lowered significantly. Hence, in compensating the effect of deterioration in the horizontal transfer efficiency, correction must be effected more strongly when the value of ISO sensitivity is high than when the value of ISO sensitivity is low.

Moreover, in the electronic camera, described in U.S. patent application publication No. 2005/0036040 A1, the amplification factor of the gain controller is corrected or modified depending on the sensitivity derived from an output signal of the image sensor, that is, on the ISO sensitivity. However, this does not provide for impeccable color correction of the generated image. On the other hand, the deterioration of the horizontal transfer efficiency worsens the color cast of an image captured with a high value of ISO sensitivity, and hence the deviation of color patch for an image becomes particularly larger, with the result that the correction of a single color, such as gray, is not sufficient.

SUMMARY OF THE INVENTION

It is an object of the present invention to provide a solid-state image pickup apparatus in which the transfer efficiency is corrected at an earlier stage of signal processing, in such a manner that it is capable of optimally compensating for the deterioration of horizontal charge transfer efficiency conspicuous in an image picked up in, e.g. a high ISO sensitivity mode without regard to the difference between specific products of image sensor or temperature and other environmental conditions.

In accordance with the present invention, there is provided a solid-state image pickup apparatus comprising an image sensor for transducing light incident on an image sensing surface, which has a plurality of pixels arranged in rows and columns, to electric signal charges on a pixel-by-pixel basis, shifting the signal charges on the rows transferred from said image sensing surface in a horizontal direction along a horizontal transfer path, concentrating the signal charges at a local portion, and transferring the concentrated signal charges to an output circuit, which converts the concentrated signal charges to an electric signal, an analog signal processor and an analog-to-digital converter for converting the electric signal to a digital image signal, and a signal processor for executing digital signal processing on the digital image signal. For main shooting, a predetermined value of ISO sensitivity, among a plurality of different values of the ISO sensitivity, is set as a value of ISO sensitivity for image pickup. The image sensor photographs a field in keeping with the value of ISO sensitivity for image pickup. The signal processor includes a horizontal transfer efficiency calculator for calculating in advance the horizontal transfer efficiency information, representing the horizontal transfer efficiency for signal charge transfer in the image sensor, in keeping with predetermined one of the different values of the ISO sensitivity, and storing the horizontal transfer efficiency information calculated, a horizontal transfer efficiency detector for acquiring the horizontal transfer efficiency information from the horizontal transfer efficiency calculator and for detecting the horizontal transfer efficiency for image pickup, consistent with the value of ISO sensitivity for image pickup, based on the horizontal transfer efficiency information, and a horizontal transfer efficiency corrector for correcting the digital image signal for compensating the horizontal transfer efficiency for image pickup.

In accordance with the present invention, there is also provided a method correcting an image comprising an image-sensing step of photo-electrically converting incident light to produce signal charges on an image sensing surface, on which a plurality of pixels are arrayed in a row direction and in a column direction, shifting the signal charges of each row transferred from said image sensing surface in the horizontal direction on a horizontal transfer path, concentrating the signal charges in a concentrating portion to transfer the charges to an output circuit, converting the signal charges, transferred to said output circuit, into an electric signal and outputting the electric signal, and a signal processing step of analog-signal processing and analog-to-digital converting the electric signal to generate a digital image signal, and for digital-signal processing the digital image signal. For main shooting, a predetermined value of ISO sensitivity, among a plurality of different values of ISO sensitivity, is set as value of ISO sensitivity for image pickup. The image sensing step photographs a field in keeping with the value of ISO sensitivity for image pickup. The signal processing step includes a horizontal transfer efficiency calculation substep of calculating in advance the horizontal transfer efficiency information, representing the horizontal transfer efficiency for signal charge transfer in the image sensor, in keeping with predetermined one of the different values of the ISO sensitivity, and storing the horizontal transfer efficiency information calculated, a horizontal transfer efficiency detection substep of acquiring the horizontal transfer efficiency information from the horizontal transfer efficiency calculation substep and for detecting the horizontal transfer efficiency for image pickup, consistent with the value of ISO sensitivity for image pickup, based on the horizontal transfer efficiency information, and a horizontal transfer efficiency correction substep of correcting the digital image signal for compensating the horizontal transfer efficiency for image pickup.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
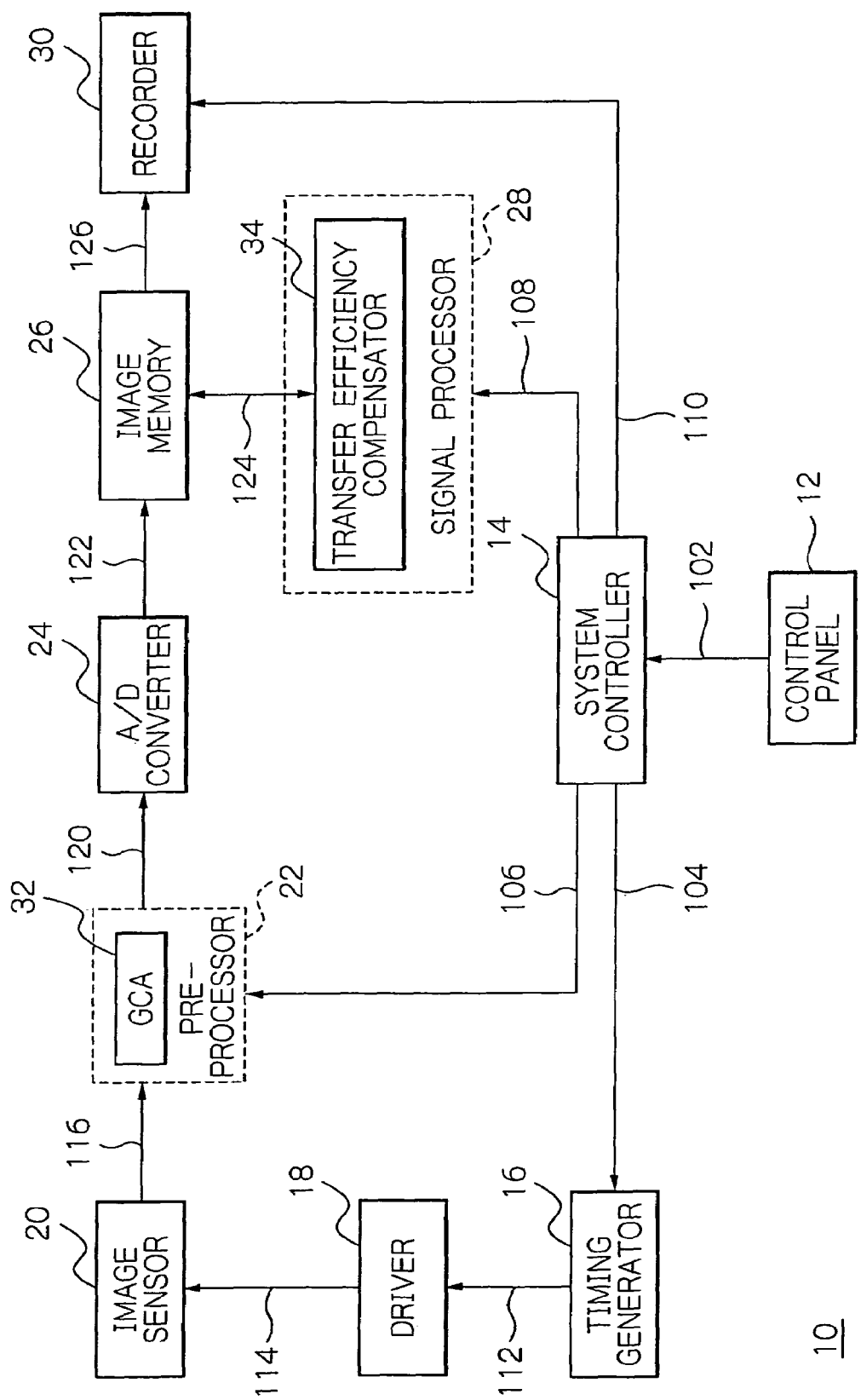
FIG. 1 is a schematic block diagram showing a preferred embodiment of a solid-state image pickup apparatus according to the present invention.

Referring now to FIG. 1 of the accompanying drawings, a solid-state image pickup apparatus embodying the present invention, generally 10, is responsive to the operator's manipulation on a control panel 12 to process under the control of a timing controller 16 and a driver 18 an image signal representative of an image of a desired scene or field captured by an image sensor 20 and output therefrom with a preprocessor 22 and an analog-to-digital (A/D) converter 24 to thereby generate a digital image signal, which is in turn temporarily stored in an image memory 26, from which the digital image signal is read out to be processed by a signal processor 28, specifically corrected by its horizontal transfer efficiency compensator 34, to be stored again in the image memory 26, while the digital image signal will again be read out form the image memory 26 to be recorded by a recorder 30. It is to be noted that part or components of the apparatus 10 not directly relevant to the understanding of the present invention are not shown and will not be described specifically in order to avoid redundancy.

In the pickup apparatus 10, any of plural different values of the ISO sensitivity, such as, ISO 100, ISO 200, ISO 400, ISO 800 or ISO 1600, is preset as an ISO sensitivity for image pickup, so that image sensing operations are carried out depending on the ISO sensitivity for image pickup.

The control panel 12 is a manual input device on which the operator of the apparatus may manually input desired information and commands. More specifically, the control panel 12, allowing the operator to input a desired command thereon, sends an operation signal 102 to the system controller 14 in accordance with the operator's manipulation, e.g. the operation of a shutter release key not shown. Signals are designated by reference numerals attached to connections on which they appear.

The system controller 14 is a general controller adapted to control the operation of the entire pickup apparatus 10 in response to the operation signal 102 received from the control panel 12, and includes a CPU (Central Processing Unit) by way of example. In the illustrative embodiment, the system controller 14 generates control signals 104, 106, 108 and 110 in response to, e.g. the operation signal 102, and feeds them to the timing generator 16, preprocessor 22, signal processor 28 and recorder 30.

The timing generator 16 includes an oscillator, not shown, for generating a system clock, or basic clock, for the timing operation of the pickup apparatus 10, and may be adapted to deliver the system clock to various blocks or subsections of the circuitry, although not shown in FIG. 1 specifically. Further, the timing generator 16 generates a timing signal 112 in response to the control signal 104 fed from the system controller 14 and feeds the timing signal 112 to the driver 18 to control the driver 18 to drive the image sensor 20.

The driver 18 serves as driving the image sensor 20. In the illustrative embodiment, the driver 18 includes a horizontal drive section, a vertical drive section, an output circuit drive section and a shutter drive section, although not shown specifically. The driver 18 generates a drive signal 114 in response to the timing signal 112 fed from the timing generator 16 and feeds the drive signal 114 to the image sensor 20. For example, the horizontal drive section, vertical drive section, output circuit drive section and shutter drive section generate a horizontal drive signal, a vertical drive signal, a reset pulse and an electronic shutter pulse, respectively, and deliver them to a horizontal charge transfer path, vertical charge transfer paths, an output circuit and an electronic shutter, not shown, of the image sensor 20, respectively.

Figure 2:
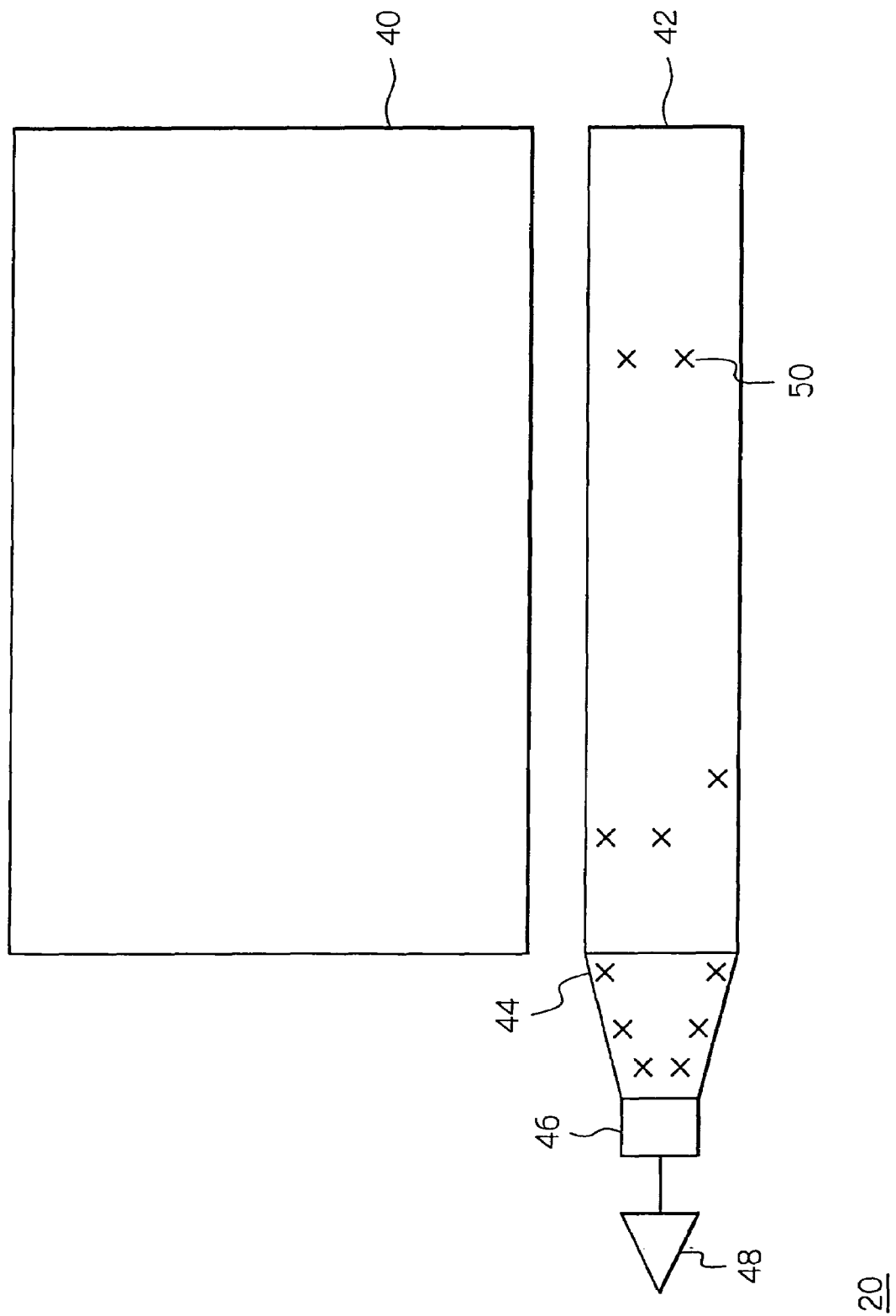
FIG. 2 is a specific plan view schematically showing an image sensor in the solid-state image pickup apparatus of the embodiment shown in FIG. 1.

FIG. 2 shows a specific configuration of the image sensor 20 in a plan view. As shown, the image sensor 20 is generally made up of an image sensing surface or photosensitive array 40 forming a single image frame, a horizontal transfer path 42, a concentrating portion 44, a floating diffusion amplifier (FDA) 46 and an output circuit 48. The image sensing surface 40 has a number of photodiodes or photosensitive cells, not shown, arranged in rows and columns. Each column of the cells, constituting a column of pixels, is connected to a vertical charge transfer path arranged on that particular column. The image sensor 20 converts the optical image of a field to an analog electric signal 116, FIG. 1, and may be implemented by a CCD (Charge Coupled Device) type of image sensor by way of example. It is noted that lattice defects 50 may be caused in the horizontal transfer path 42 or in the concentrating portion 44 when the image sensor 20 is manufactured.

In the illustrative embodiment, the image sensor 20 may be configured to read out, under the control of the drive signal 114, signal charges generated in the photosensitive cells in response to incident light to the vertical transfer paths, sequentially shift the signal charges along the vertical transfer paths in response to the vertical drive signal included in the drive signal 114, transfer the signal charges from the vertical transfer paths to the horizontal transfer path 42 row by row, and shift the signal charges over the horizontal transfer path 42 in the horizontal direction in response to the horizontal drive signal also included in the drive signal 114. The signal charges are then concentrated in the concentrating portion 44 and thence transferred to the FDA amplifier 46. The FDA amplifier 46 effects resetting, responsive to reset pulses of the drive signal 114, from one pixel to another, to prevent colors from being mixed between neighboring pixels. The resulting signal charges are routed to the output circuit 48. The output circuit 48 converts the signal charges input thereto to the analog electric signal 116.

In the image sensing surface 40 of the illustrative embodiment, the plural photosensitive cells may be optical sensors, such as photodiodes, configured for transducing incident light into an electrical signal corresponding to the light volume received. The photosensitive cells may be arranged in a matrix pattern, inclusive of color filters for red (R), green (G) and blue (B) light beams. In this case, the photosensitive cells may be arranged in a so-called "honeycomb" pattern, with each photosensitive cell offset in the row and column directions with respect to a neighboring cell, or alternatively in a square matrix pattern, with each cell arranged at a predetermined pitch in the row and column directions.

In the illustrative embodiment, the horizontal transfer path 42 may be of the type having potential packets formed each in association with a column of pixels on the imaging surface 40. The signal charges of respective rows, transferred from the vertical transfer paths, are stored in packets from one column to the next. The signal charges in one of those packets are sequentially transferred, responsive to the horizontal drive signal, to a neighboring packet towards the concentrating portion 44, and transferred to the concentrating portion 44.

Referring again to FIG. 1, the preprocessor 22 is adapted to execute analog signal processing on the analog electric signal 116 representative of an image in response to the control signal 106 fed from the system controller 14, thereby outputting an analog image signal 120.

The preprocessor 22 includes a clamping circuit, not shown, where the analog electric signal 116 is subjected to OB (Optical Black) clamping, from row to row, so that its block level will be pulled into a predetermined offset. For example, a 14-bit analog electric signal 116 is clamped to an offset having its value equal to 512.

In the illustrative embodiment, the preprocessor 22 includes a gain-controlled amplifier (GCA) 32 for controlling the gain of the analog electric signal 116 on the basis of ISO (International Standards Organization) sensitivity indicated by the control signal 106.

The GCA amplifier 32 is responsive to the control signal 106, indicating any of the sensitivities, ISO 100, ISO 200, ISO 400, ISO 800 and ISO 1600, for example, to amplify the electric signal with a predetermined gain for the ISO 100, and with the gains equal to two, four, eight and sixteen times as large as the predetermined gain for the ISO 100, for the cases of the sensitivities, ISO 200, ISO 400, ISO 800 and ISO 1600, respectively.

The A/D converter 24 is adapted for quantizing the analog image signal 120 input from the preprocessor 22 with predetermined quantization levels to thereby output a corresponding digital-image signal 122.

The image memory 26 is implemented as a buffer memory for temporarily storing a digital image signal. In the illustrative embodiment, the image memory 26 is capable of temporarily storing the digital image signal 122 fed from the A/D converter 24 or a digital image signal 124 output from the signal processor 28.

The signal processor 28 is connected to the image memory 26 to transfer and receive digital image signal 124 to and from the memory 26. The signal processor 28, with the illustrative embodiment, functions as processing the digital image signal 124 read out from the image memory 26 and then writing the processed digital image signal 124 in the image memory 26.

More specifically, the signal processor 28 processes the digital image signal 124 with an offset corrector, a white balance (WB) corrector, a gamma corrector, a synchronizing circuit, a contour or edge enhancing circuit, a noise reducing circuit, a saturation enhancing circuit, a compressing circuit and so forth, although not shown specifically. Particularly, in the illustrative embodiment, the signal processor 28 may include the transfer efficiency compensator 34 to correct the digital image signal 124 to compensate for the horizontal transfer efficiency of the digital image signal 124.

The signal processor 28 of the illustrative embodiment corrects the whiting of the black level in the digital image signal 124, caused by the OB clamping processing, by the offset corrector, and applies an offset correction of e.g. −512 on the entire frame of an image. The signal processor 28 routes the digital image signal 124, thus corrected in offset, to the transfer efficiency compensator 34, to further correct the signal for the horizontal charge transfer efficiency.

Figure 3:
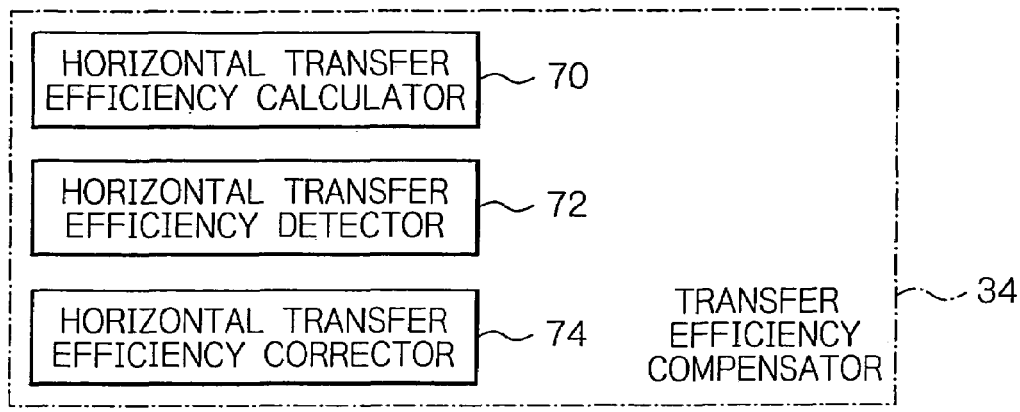
FIG. 3 is a specific block diagram schematically showing a transfer efficiency compensator in a signal processor of a solid-state image pickup apparatus of the embodiment shown in FIG. 1.

Referring now to FIG. 3, the transfer efficiency compensator 34 of the illustrative embodiment includes a horizontal transfer efficiency calculator 70, a horizontal transfer efficiency detector 72 and a horizontal transfer efficiency corrector 74.

The horizontal transfer efficiency calculator 70 is adapted to calculate the local horizontal charge transfer efficiency for signal charge transfer in the concentrating portion 44, for each of the plural different values of ISO sensitivity, and store data of the resultant local horizontal transfer efficiency in its horizontal transfer efficiency memory, not shown. The horizontal transfer efficiency calculator 70 outputs the local horizontal transfer efficiency responsive to the value of ISO sensitivity as specified by an external circuit block. The horizontal transfer efficiency calculator 70 may be adapted to store data of the local horizontal transfer efficiency with respect to a signal quantity of interest in the form of table or function f0(S).

For example, in an application in which the horizontal transfer efficiency calculator 70 is adapted to store the data of the local horizontal transfer efficiency in the table, the horizontal transfer efficiency calculator 70 analyzes the quantity of the local remainder signal charge, left over untransferred in the concentrating portion 44, and, for example, sets as a local remainder quantity the quantity of signal charge left over from forward local pixel data, obtained from the pixel column on the image sensing surface 40 closest to the concentrating portion 44, to backward local pixel data, obtained from the pixel column following the first-stated pixel column in the horizontal direction. From the digital image signal 124, the horizontal transfer efficiency calculator 70 detects, from one row to another, the forward local pixel data and the backward local pixel data among the pixel data representing the signal quantities of the respective pixels. If the forward local pixel data are to be the remainder signal quantity of interest, the horizontal transfer efficiency calculator 70 detects the local remainder quantity for the signal quantity of interest, with respect to the forward and backward local pixel data, and forms the table defining the relationship of correspondence between the signal quantity of interest and the local remainder quantity, from one pixel row to another, to store the data of the local horizontal transfer efficiency.

Figure 4:
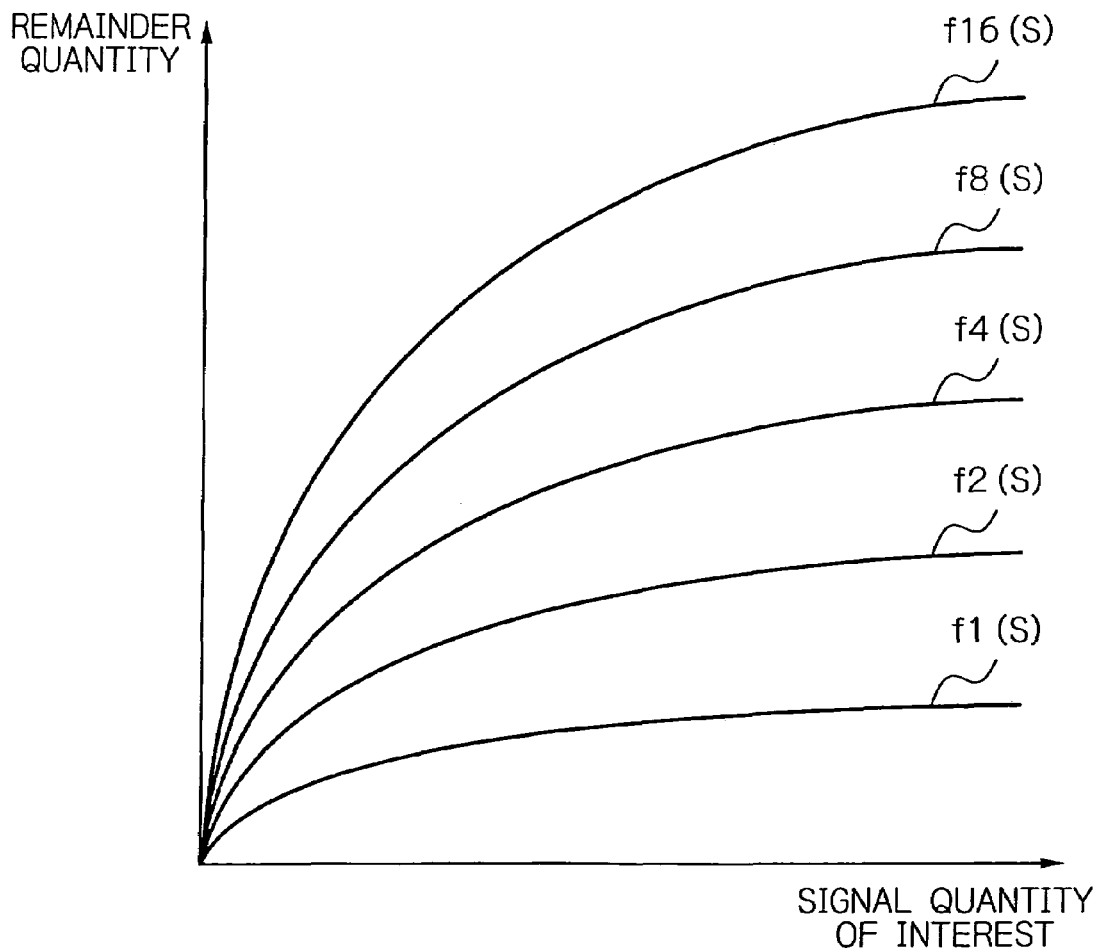
FIG. 4 is a graph plotting the horizontal transfer efficiencies for the different values of ISO sensitivity in the solid-state image pickup apparatus of the embodiment shown in FIG. 1.

In an application where the data of the local horizontal transfer efficiency are to be stored in the form of function f0(S), the horizontal transfer efficiency calculator 70 calculates the function, representing the local horizontal transfer efficiency, based on the relationship of correspondence between the signal quantity of interest and the local remainder quantity as detected. The local remainder quantity may be plotted in a graph, against the signal quantity of interest, as shown in FIG. 4. In This manner, a series of curves 150 may be obtained, which represent the relationship of correspondence between the signal quantity of interest and the local remainder quantity. The horizontal transfer efficiency calculator 70 renders this relationship of correspondence into a function, for example a quadratic function, to calculate the function f0(S) indicating the local horizontal transfer efficiency for a predetermined signal quantity of interest S.

For example, the horizontal transfer efficiency calculator 70 may be designed to calculate the function f0(S) from each of the values of ISO sensitivity in such a fashion that the horizontal transfer efficiency calculator 70 calculates the local horizontal transfer efficiencies, f1(S), f2(S), f4(S), f8 (S) and f16 (S), for the sensitivities, ISO 100, ISO 200, ISO 400, ISO 800 and ISO 1600, respectively. In this manner, the horizontal transfer efficiency calculator 70 stores the data of the horizontal transfer efficiency of a lower remainder quantity for the lower value of ISO sensitivity, while storing the horizontal transfer efficiency of a higher remainder quantity for the higher value of ISO sensitivity.

The horizontal transfer efficiency calculator 70 may also be adapted for calculating and storing only the data of the local horizontal transfer efficiency f0(S) for a reference value of ISO sensitivity, among the plural different values of the value of ISO sensitivity. For example, the horizontal transfer efficiency calculator 70 may calculate only the local horizontal transfer efficiency f4 (S) for ISO 400 to store the so calculated local horizontal transfer efficiency in the horizontal transfer efficiency memory. The external block then for example, controls the gain to adjust the reference local horizontal transfer efficiency f0(S) to derive the local horizontal transfer efficiency for any desired value of ISO sensitivity.

Preferably, the data installation in the horizontal transfer efficiency calculator 70 may be run, in advance, in the manufacture process, such as the time of shipping the image sensing device or of adjusting the image sensing capability of the apparatus 10 to calculate the local horizontal transfer efficiency and store the resultant local horizontal transfer efficiency in its local transfer efficiency memory.

The horizontal transfer efficiency detector 72 is configured to detect the local horizontal transfer efficiency for the value of ISO sensitivity for the image pickup. For example, the horizontal transfer efficiency detector 72 may specify the value of ISO sensitivity for the image pickup to acquire the local horizontal transfer efficiency for the value of ISO sensitivity of interest from the horizontal transfer efficiency calculator 70. Alternatively, the detector 70 may acquire the reference local horizontal transfer efficiency to make adjustment to acquire the local horizontal transfer efficiency for the value of ISO sensitivity for the image pickup.

For example, if the value of ISO sensitivity for the image pickup is ISO 100, the horizontal transfer efficiency detector 72 then acquires the local horizontal transfer efficiency f1(S), from the horizontal transfer efficiency calculator 70, and sets it as a local horizontal transfer efficiency f0(S). In a similar manner, if the value of ISO sensitivity for the image pickup is ISO 200, ISO 400, ISO 800 or ISO 1600, the horizontal transfer efficiency detector 72 acquires the local horizontal transfer efficiency f2(S), f4(S), f8(S) or f16(S) from the horizontal transfer efficiency calculator 70, respectively, and sets it as a local horizontal transfer efficiency f0(S).

When acquiring the reference local horizontal transfer efficiency from the horizontal transfer efficiency calculator 70, the horizontal transfer efficiency detector 72 adjusts the gain of the local horizontal transfer efficiency, depending on the value of ISO sensitivity for the image pickup, in order to detect the desired horizontal transfer efficiency.

The horizontal transfer efficiency corrector 74 finds out a correction value, used for compensating for the local horizontal transfer efficiency, associated with the value of ISO sensitivity for the image pickup, from one pixel data to another, to correct the digital image signal 124.

Assume that the signal quantity obtained with a given pixel at a pixel position x distant from the concentrating portion 44 in the horizontal direction is denoted $S0(x)$. The horizontal transfer efficiency corrector 74 of the illustrative embodiment uses the local horizontal transfer efficiency f0(S), as detected by the horizontal transfer efficiency detector 72, to calculate a remainder quantity $f0(S0(x))$. The horizontal transfer efficiency corrector 74 calculates a remainder quantity $f0(S0(x-1))$ for the pixel data $S0(x-1)$) at the directly previous pixel position x−1, while calculating a correction quantity $\Delta S(x)$ for the preset pixel data $S0(x)$ by the expression $\Delta S(x)=f0(S0(x))-f0(S0(x-1))$. The horizontal transfer efficiency corrector 74 may calculate the correction quantity $\Delta S(x)$ for all pixel data $S0(x)$ to store the so calculated correction quantities in its memory, not shown.

The horizontal transfer efficiency corrector 74 also uses the transfer efficiency correction quantity $\Delta S(x)$ to correct the data $S0(x)$ of the given pixel, and calculates digital image data $S1(x)$ corrected by the expression $S1(x)=S0(x)+\Delta S(x)$. In this manner, the horizontal transfer efficiency corrector 74 corrects data of every pixel to compensate for the horizontal transfer efficiency for all pixel data, and stores the thus corrected digital image signal 124 in the image memory 26.

The recorder 30 serves as receiving and recording the digital image signal 126 output from the signal processor 28. In the illustrative embodiment, the recorder 30 is configured to write the digital image signal 126, which has been compressed by the compressing circuit of the signal processor 28, in a data recording medium not shown. The data recording medium may be implemented by, e.g. a package accommodating a memory card with a semiconductor memory or a magneto-optical disk or similar rotary recording medium. Such a data recording medium may be removably mounted to the recorder 30.

The operation of storing the horizontal transfer efficiency in the solid-state image pickup apparatus 10 of the illustrative embodiment will now be described. For the apparatus 10, the horizontal transfer efficiency is in advance calculated, which may differ from one image sensor to another, in, e.g. its manufacture process, and stored as a so calculated value.

Initially, the apparatus 10 has a predetermined value of ISO sensitivity set, and a subject field to be photographed is then shot. The field to be photographed is captured by the image sensor 20.

In the image sensor 20, an image of the field photographed is photo-electrically converted, responsive to the drive signal 114 from the driver 18, to signal charges for the photosensitive cells or pixels. The signal charges for the pixels are transferred via vertical transfer path, horizontal transfer path 42 and output circuit 48, to be converted to a corresponding analog electric signal 116, which will be routed to the pre-processor 22.

In the pre-processor 22, the analog electric signal 116 is processed in analog, and, in the illustrative embodiment, in particular, is clamped by a clamping circuit, not shown, so as to be amplified by the GCA amplifier 32 with a gain which is determined in dependent on the value of ISO sensitivity indicated by the control signal 106 from the system controller 14.

The analog image signal 120, processed by the pre-processor 22, is converted via the A/D converter 24 into the corresponding digital image signal 122, which will temporarily be stored in the image memory 26.

The digital image signal 124, stored in the image memory 26, is readout to the signal processor 28 for signal processing. In the illustrative embodiment, in particular, the digital image signal is corrected for offset, and the horizontal transfer efficiency is calculated by the transfer efficiency compensator 34 and stored.

In the transfer efficiency compensator 34, the forward pixel data closest to the concentrating portion 44, and the backward pixel data, following the forward pixel data in the horizontal direction, are initially detected from each pixel row, in the horizontal transfer efficiency calculator 70, based on the digital image signal, corrected for offset. The local remainder quantity with respect to the signal quantity of interest is detected, based on these pixel data.

Then, in the transfer efficiency compensator 34 of the illustrative embodiment, the function f0(S), defining the local horizontal transfer efficiency with respect to the preset signal quantity of interest S, is calculated on the basis of the signal quantity of interest and the local remainder quantity. In the illustrative embodiment, the local horizontal transfer efficiency f0(S) is calculated for each of a large variety of different values of ISO sensitivity, such as ISO 100, ISO 200, ISO 400, ISO 800 and ISO 1600, and stored in the horizontal transfer efficiency memory. This completes the horizontal transfer efficiency storage operation.

Figure 5:
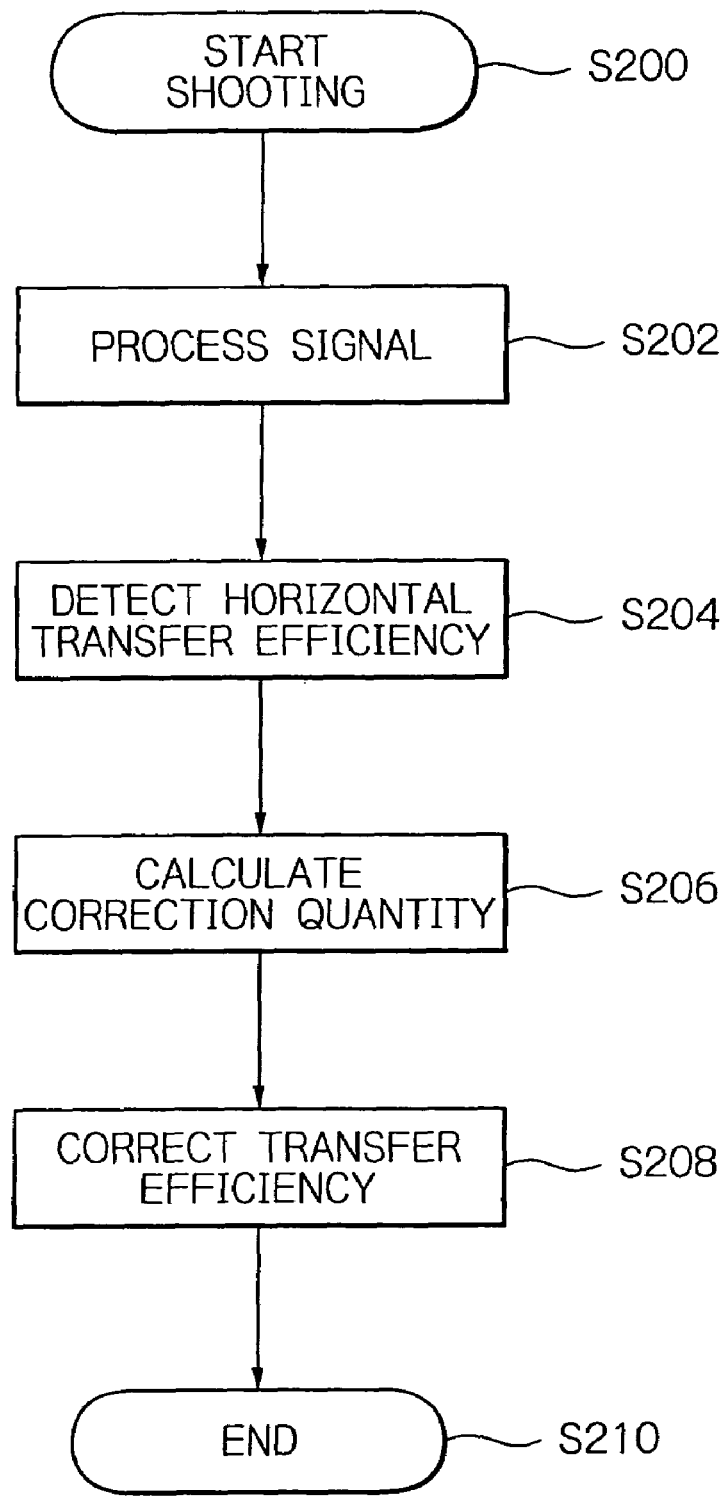
FIG. 5 is a flowchart useful for understanding the operational sequence in the solid-state image pickup apparatus of the embodiment shown in FIG. 1.
Figure 6:
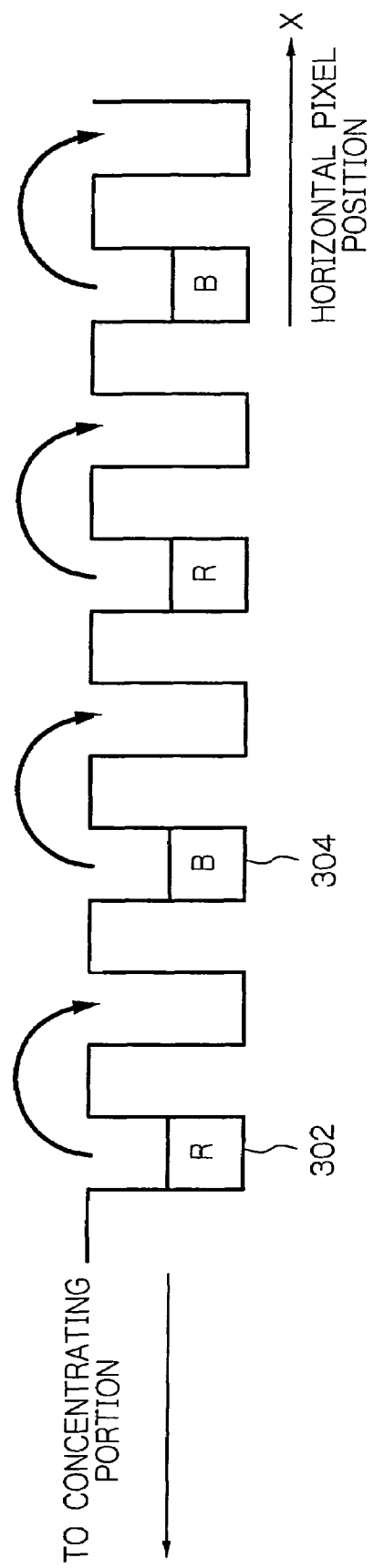
FIG. 6 schematically shows the transfer on a horizontal transfer path of signal charges representing the gray incident light in a conventional solid-state image pickup apparatus.
Figure 7:
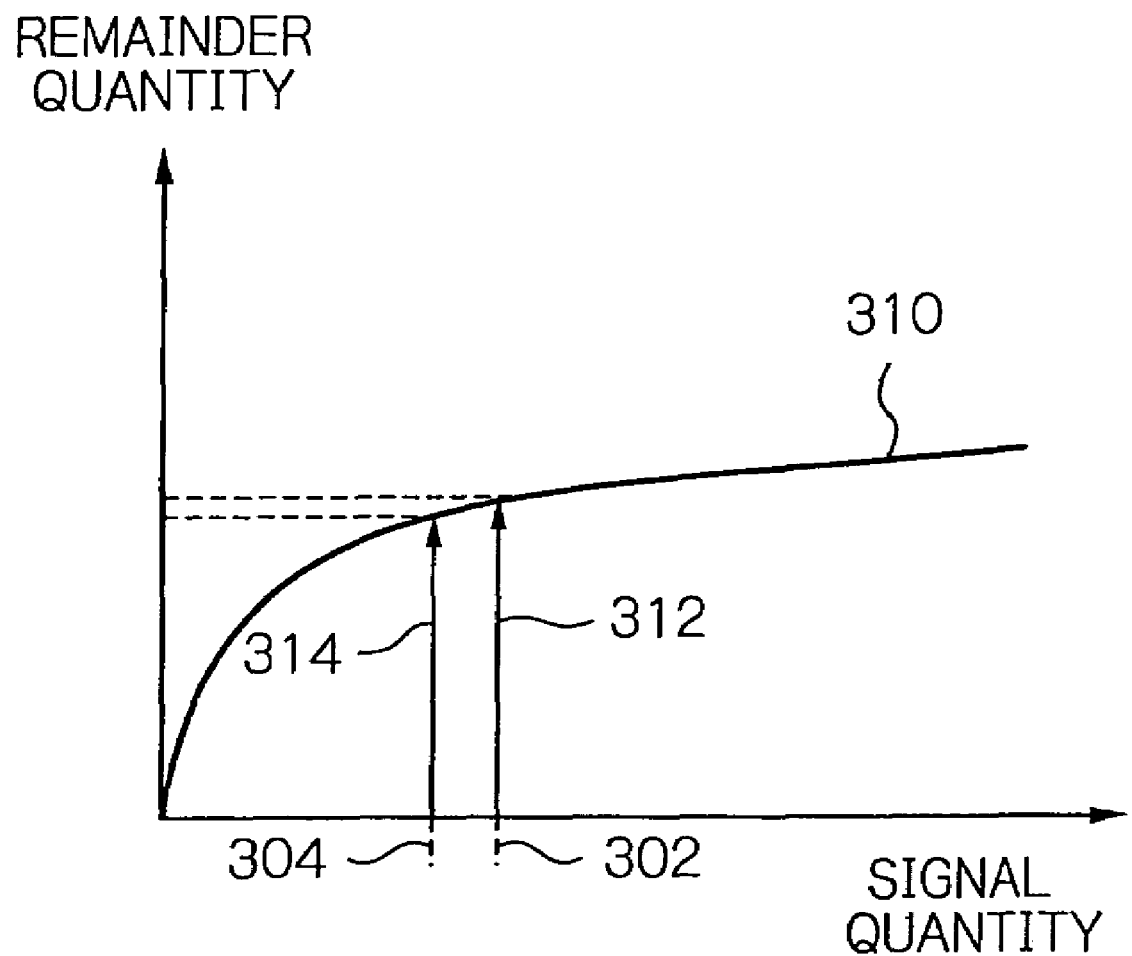
FIG. 7 is a graph plotting the remainder quantities of signal charge representing the gray incident light on the horizontal transfer path of a conventional solid-state image pickup apparatus.
Figure 8:
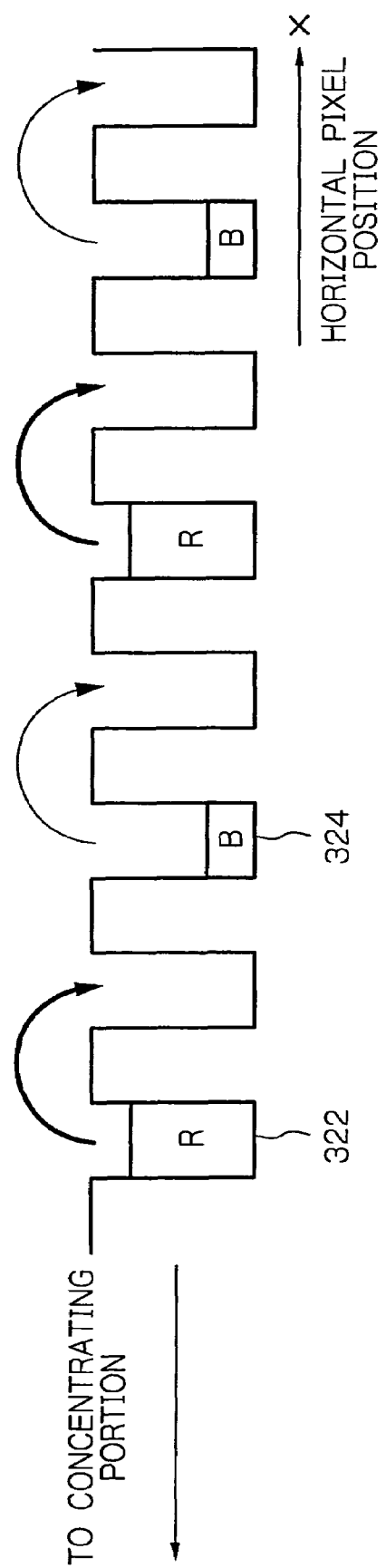
FIG. 8 schematically shows the transfer on a horizontal transfer path of signal charges representing the red incident light in a conventional solid-state image pickup apparatus.
Figure 9:
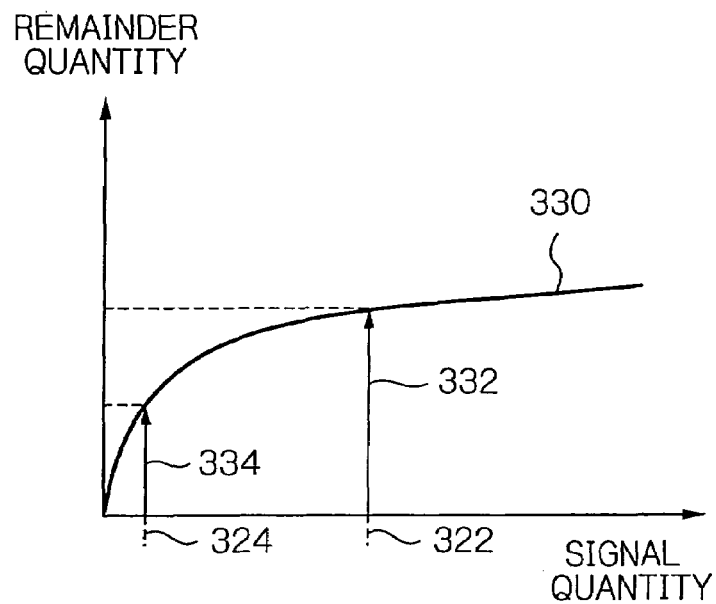
FIG. 9 is a graph plotting the remainder quantities of signal charge representing the red incident light on a horizontal transfer path of a conventional solid-state image pickup apparatus.
Figure 10:
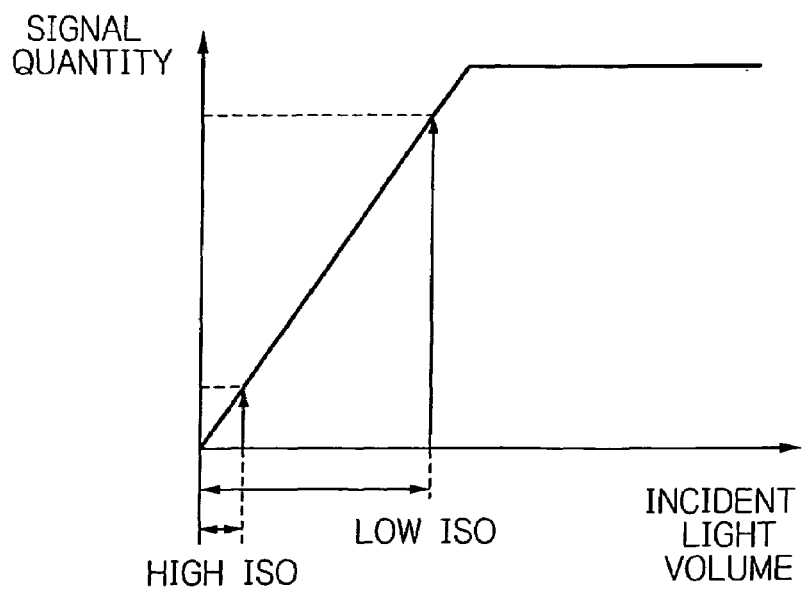
FIG. 10 is a graph in which the quantities of signals generated are plotted against the volume of incident light in image sensors of the conventional solid-state image pickup apparatus.
Figure 11:
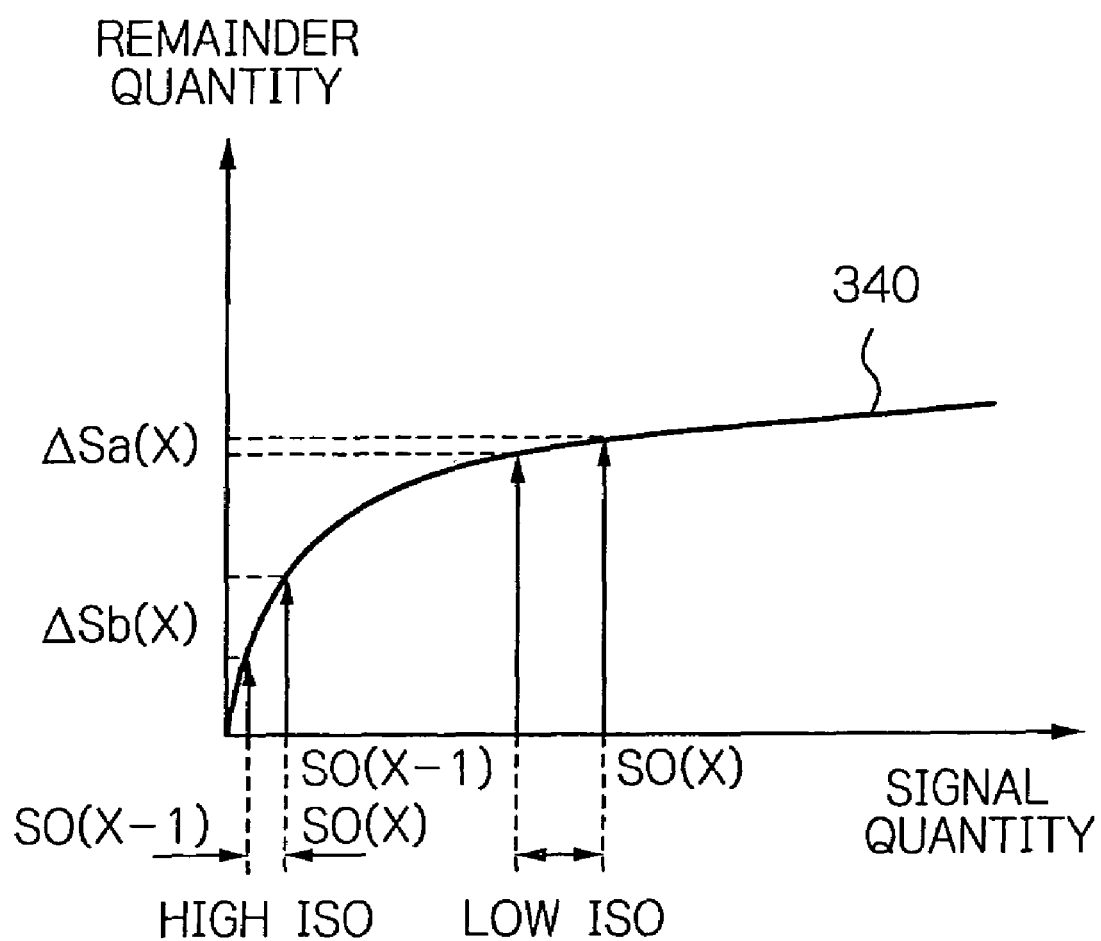
FIG. 11 is a graph plotting the quantities of signal charges left over on a horizontal transfer path for different values of the value of ISO sensitivity.

Referring to the flowchart of FIG. 5, the operation will now be described for compensating for the horizontal transfer efficiency of an image, captured with value of ISO sensitivity for the image pickup, in the solid-state image pickup apparatus 10 of the illustrative embodiment. In the apparatus 10, an image sensing operation is started in a step S200. An image picked up by the image sensor 20 with the value of ISO sensitivity for the image pickup is processed by the pre-processor 22 and the A/D converter 24 to thereby be converted into the digital image signal 122. This digital image signal 122 will temporarily be stored in the image memory 26.

The digital image signal 124 in the image memory 26 is read out to the signal processor 28 where it is subjected to digital signal processing (step S202). At this time, the digital image signal 124, corrected for offset, is supplied to the transfer efficiency compensator 34 of the signal processor 28 and corrected for compensating the horizontal transfer efficiency.

In the transfer efficiency compensator 34, the value of ISO sensitivity for the image pickup is initially detected in the transfer efficiency detector 72, in a step S204. The local horizontal transfer efficiency f0(S), consistent with the value of ISO sensitivity for the image pickup, is detected from the horizontal transfer efficiency calculator 70.

Then, the processing advances to a step S206. In the horizontal transfer efficiency corrector 74 of the transfer efficiency compensator 34, the remainder quantity f0(S0($x$)) of the preset pixel data S0($x$) at a horizontal pixel position x is calculated, based on the local horizontal transfer efficiency f0(S) detected in the step S204. The remainder quantity f0(S0($x$−1)) of the preset pixel data S0($x$−1) at the horizontal pixel position x is also calculated. The transfer efficiency correction quantity ΔS(x) is calculated from the remainder quantities f0(S0($x$)) and f0(S0($x$−1)). The horizontal transfer efficiency corrector 74 calculates the transfer efficiency correction quantity ΔS(x) for each of all pixel data.

Then, the processing advances to a step S208, where the horizontal transfer efficiency corrector 74 uses the transfer efficiency correction quantity ΔS(x) found out in the step S204 to correct the preset pixel data S0($x$), thus calculating the corrected pixel data S1($x$). In this manner, the horizontal transfer efficiency corrector 74 corrects every pixel data of the digital image signal 124 such as to compensate the horizontal transfer efficiency. The digital image signal 124, corrected for the transfer efficiency, is re-routed to the image memory 26 for storage thereinto complete the operation for compensating the horizontal transfer efficiency.

In an alternative embodiment, the apparatus 10 is designed and arranged so that its transfer efficiency compensator 34 calculates the horizontal transfer efficiency for signal charge transfer in the all stages of the horizontal transfer path 42 of the image sensor 20, to compensate the effect of the horizontal transfer efficiency on the digital image signal 124 based on the horizontal transfer efficiency for all stages.

In the horizontal transfer efficiency calculator 70 of the alternative embodiment, the horizontal transfer efficiency for all stages is calculated from one value of ISO sensitivity to another and stored in its horizontal transfer efficiency memory, not shown. In the horizontal transfer efficiency calculator 70, the horizontal transfer efficiency for all stages related to each value of ISO sensitivity is also output. The horizontal transfer efficiency calculator 70 may store the horizontal transfer efficiency for all stages with respect to the signal quantity of interest in the form of table or of function fH(S). The horizontal transfer efficiency calculator 70 may be run at the outset, for example, in the course of a fabrication process, to calculate the horizontal transfer efficiency for all stages.

In the case where the horizontal transfer efficiency for all stages is to be stored in a table, the horizontal transfer efficiency calculator 70 analyzes a remainder quantity for all stages, left over untransferred throughout the entire stages of the horizontal transfer path 42. For example, the horizontal transfer efficiency calculator 70 sets a quantity of signal charges left over from forward all-stage pixel data obtained from the pixel column remotest from the concentrating portion 44 on the image sensing surface 40 to backward all-stage pixel data-obtained from optically shielded pixels, such as black pixels, following the first-stated column in the horizontal direction, as a remainder quantity for all stages.

It is noted that the horizontal transfer efficiency calculator 70 detects the forward and backward all-stage pixel data, based on the digital image signal 124, from one pixel row to another, and detects the remainder quantity for all stages with respect to the forward all-stage pixel data as the signal quantity of interest. The horizontal transfer efficiency calculator 70 stores the horizontal transfer efficiency for all stages in a table, defining the relationship of correspondence between the signal quantity of interest and the local remainder quantity from row to row.

In storing the horizontal transfer efficiency for all stages in the form of a function fH(S), the horizontal transfer efficiency calculator 70 operates the function defining the horizontal transfer efficiency for all stages, based on the as-detected relationship of correspondence between the signal quantity of interest and the remainder quantity for all stages. The horizontal transfer efficiency calculator 70 may calculate the horizontal transfer efficiency for all stages fH(S) with respect to the preset signal quantity of interest S, in the same way as in operating the function for the local horizontal transfer efficiency. Alternatively, the calculator 70 may calculate the horizontal transfer efficiency for all stages fH(S) from one value of ISO sensitivity to another. Further alternatively, the horizontal transfer efficiency calculator 70 may calculate and store only the reference horizontal transfer efficiency for all stages fH(S).

The horizontal transfer efficiency detector 72 of the alternative embodiment detects horizontal transfer efficiency for all stages consistent with the value of ISO sensitivity for the image pickup. As in the case of detection of the local horizontal transfer efficiency, the horizontal transfer efficiency detector 72 may acquire the horizontal transfer efficiency for all stages, consistent with the value of ISO sensitivity for the image pickup, from the horizontal transfer efficiency calculator 70, or may acquire the reference horizontal transfer efficiency for all stages. When acquiring the reference horizontal transfer efficiency for all stages, the horizontal transfer efficiency detector 72 may carry out gain adjustment of the horizontal transfer efficiency for all stages, depending on the value of ISO sensitivity for the image pickup, to detect the desired horizontal transfer efficiency.

The horizontal transfer efficiency corrector 74 of the alternative embodiment also calculates a correction quantity, used for compensating the horizontal transfer efficiency for all stages, which is consistent with the value of ISO sensitivity for the image pickup, from one pixel data to another, for correcting the digital image signal 124.

The horizontal transfer efficiency corrector 74 uses the horizontal transfer efficiency for all stages fH(S) to calculate the remainder quantity fH(S0($x$)), for preset pixel data S0($x$), at a pixel position x in the horizontal direction from the concentrating portion 44. The horizontal transfer efficiency corrector 74 also calculates the remainder quantity fH(S0($x$−1)), for the pixel data S0($x$−1), at the directly previous pixel position x−1, and calculates the transfer efficiency correction quantity ΔS(x) for the preset pixel data S0($x$) by the expression ΔS(x)=fH(S0($x$))−fH(S0($x$−1)).

When the horizontal transfer efficiency for all stages is to be corrected with importance placed on the central portion of a frame of image, the horizontal transfer efficiency corrector 74 may calculate the transfer efficiency correction quantity ΔS(x) by the expression ΔS(x)=fH(S0($x$))−fH(S0($x$−1)).

The horizontal transfer efficiency corrector 74 may also calculate the transfer efficiency correction quantity ΔS(x) under the premises that each stage of the horizontal transfer path 42 is deteriorated equally. In this case, the horizontal transfer efficiency g(S), which is equal for the entire stage of the horizontal transfer path 42, may be calculated by an expression g(S)=fH(S)/H, and the remainder quantity at the pixel position x is represented by x*g(S), the horizontal transfer efficiency corrector 74 calculates the transfer efficiency correction quantity ΔS(x)=x*g(S0(x))−x*g(S0(x−1)). This expression may also be in the form of ΔS(x)=(x/H)*(fH(S0(x))−(fH(S0(x−1))).

As in the above-described embodiment for compensating for the local horizontal transfer efficiency, the horizontal transfer efficiency corrector 74 of the alternative embodiment may correct all pixel data.

As a further alternative embodiment, the apparatus 10 may be designed and constructed so that both the local horizontal transfer efficiency and the horizontal transfer efficiency for all stages are calculated by the transfer efficiency compensator 34 for compensating the effect of the horizontal transfer efficiency on the digital image signal 124 based on the so calculated local and all-stage horizontal transfer efficiencies.

The horizontal transfer efficiency calculator 70 of the further alternative embodiment calculates the local horizontal transfer efficiency and the horizontal transfer efficiency for all stages, for each of the plural different value of ISO sensitivity, as in the above-described embodiment. The horizontal transfer efficiency calculator 70 also stores the local horizontal transfer efficiency and the horizontal transfer efficiency for all stages in its horizontal transfer efficiency memory, not shown, while outputting the local horizontal transfer efficiency and the horizontal transfer efficiency for all stages consistent with the value of ISO sensitivity. The horizontal transfer efficiency calculator 70 may store the local and all-stage horizontal transfer efficiencies in the table or as functions f0(S) and fH(S). The data installation in the horizontal transfer efficiency calculator 70 may be run in the course of, for example the manufacture process.

On the other hand, the horizontal transfer efficiency calculator 70 may use the local horizontal transfer efficiency f0(S) and horizontal transfer efficiency for all stages fH (S) to calculate the horizontal transfer efficiency g(S), which is equal throughout the stages of the horizontal transfer path 42. For example, the horizontal transfer efficiency calculator 70 may calculate the uniform horizontal transfer efficiency g(S) by the expression g(S)=(fH(S)−f0(S))/H to store the local horizontal transfer efficiency and uniform horizontal transfer efficiency. The horizontal transfer efficiency calculator 70 may also store the uniform horizontal transfer efficiency from one value of ISO sensitivity to another.

In an application where the horizontal transfer efficiency calculator 70 stores the local horizontal transfer efficiency and horizontal transfer efficiency for all stages, the horizontal transfer efficiency detector 72 detects the local horizontal transfer efficiency and horizontal transfer efficiency for all stages consistent with the value of ISO sensitivity for the image pickup. In another application where the horizontal transfer efficiency calculator 70 stores the local horizontal transfer efficiency and uniform horizontal transfer efficiency, the horizontal transfer efficiency detector 72 detects the local horizontal transfer efficiency and uniform horizontal transfer efficiency consistent with the value of ISO sensitivity for the image pickup.

The horizontal transfer efficiency corrector 74 of the alternative embodiment calculates a correction quantity for compensating both the local horizontal transfer efficiency and horizontal transfer efficiency for all stages, consistent with the value of ISO sensitivity for the image pickup, to correct the digital image signal 124, from one pixel data to another.

In the case in which the horizontal transfer efficiency calculator 70 stores the local horizontal transfer efficiency f0(S) and horizontal transfer efficiency for all stages fH (S), the horizontal transfer efficiency corrector 74 calculates the uniform horizontal transfer efficiency g(S).

The horizontal transfer efficiency corrector 74 also calculates the remainder quantity f(S0(x)) for the preset pixel data S0(x), at a horizontal pixel position x from the concentrating portion 44, based on the local horizontal transfer efficiency f0(S) and the uniform horizontal transfer efficiency g(S), using an expression f(S0(x))=f0(S0(x))+x*g(S0(x)), as an example. The horizontal transfer efficiency corrector 74 also calculates the remainder quantity f(S0(x−1)) for the pixel data S0(x−1) at the pixel position x−1 directly previous to the preset pixel data S0(x) and, using these remainder quantities, calculates the transfer efficiency correction quantity ΔS(x) by the expression ΔS(x)=f(S0(x))−f(S0(x−1)), as an example.

Further in the case where the horizontal transfer efficiency corrector 74 corrects the local horizontal transfer efficiency and the horizontal transfer efficiency for all stages with importance attached to the middle portion of a frame of image, the transfer-efficiency correction quantity ΔS(x) may be calculated using the expression ΔS(x)=(f0(S0(x))−(f0(S0(x−1)))/2.

The horizontal transfer efficiency corrector 74 of the alternative embodiment may also correct each pixel data, as in the case of compensating only the local horizontal transfer efficiency or the horizontal transfer efficiency for all stages, as in the previous embodiments.

In summary, with the solid-state image pickup apparatus, according to the present invention, the information representing the horizontal transfer efficiency is stored at the outset. When a signal representative of an image captured is processed, in main shooting, in which a value of ISO sensitivity for image pickup has been set, the horizontal transfer efficiency detected are used to correct the pixel data for the image being captured. It is thus possible to optimally compensate for deterioration in the horizontal transfer efficiency despite difference in properties of an image sensor or in photographing conditions used. Thus, in the apparatus, it is unnecessary to correct color cast in a high ISO mode, without dependency on a subject being shot or on color temperatures.

The entire disclosure of Japanese patent application No. 2005-142186, filed on May 16, 2005, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A solid-state image pickup apparatus comprising:
   an image sensor for transducing light incident on an image sensing surface, which has a plurality of pixels arranged in rows and columns, to electric signal charges on a pixel-by-pixel basis, shifting the signal charges on the rows transferred from said image sensing surface in a horizontal direction along a horizontal transfer path, concentrating the signal charges at a local portion, and transferring the concentrated signal charges to an output circuit, which converts the concentrated signal charges to an electric signal;
   an analog signal processor and an analog-to-digital converter for converting the electric signal to a digital image signal; and
   a signal processor for executing digital signal processing on the digital image signal;

wherein, for main shooting, a predetermined value of ISO sensitivity, among a plurality of different values of the ISO sensitivity, is set as a value of ISO sensitivity for image pickup;

said image sensor photographing a subject field in keeping with the value of ISO sensitivity for image pickup;

said signal processor comprising:

a horizontal transfer efficiency calculator for calculating in advance the horizontal transfer efficiency information, representing the horizontal transfer efficiency for signal charge transfer in said image sensor, in keeping with predetermined one of the different values of the ISO sensitivity, and storing the horizontal transfer efficiency information calculated;

a horizontal transfer efficiency detector for acquiring the horizontal transfer efficiency information from said horizontal transfer efficiency calculator and for detecting the horizontal transfer efficiency for image pickup, consistent with the value of ISO sensitivity for image pickup, based on the horizontal transfer efficiency information; and a horizontal transfer efficiency corrector for correcting the digital image signal for compensating the horizontal transfer efficiency for image pickup, and wherein said horizontal transfer efficiency calculator calculates, as the horizontal transfer efficiency information, the local horizontal transfer efficiency for signal charge transfer in said concentrating portion and/or the horizontal transfer efficiency for all stages for signal charge transfer in said horizontal transfer path.

2. The apparatus in accordance with claim 1, wherein storage in said horizontal transfer efficiency calculator is carried out in advance in a course of a manufacturing process such as shipping of an image sensor device having said image sensor or adjustment for an image sensing operation for said apparatus.

3. The apparatus in accordance with claim 1, wherein, when calculating the local horizontal transfer efficiency, a pixel in each pixel row in a first pixel column closest to said concentrating portion and a pixel in each pixel row in a second pixel column following the first pixel column, on said image sensing surface, are assumed as a first pixel and a second pixel, respectively, said horizontal transfer efficiency calculator detecting, among pixel data indicating signal quantities of respective pixels based on the digital image signal, forward local pixel data indicating the signal quantity obtained in the first pixel and backward local pixel data indicating the signal quantity obtained in the second pixel, from pixel row to pixel row, and detecting the local remainder quantity, left over untransferred in said concentrating portion, based on the forward local pixel data and on the backward local pixel data, to store the local relationship of correspondence representing the local remainder quantity with respect to the signal quantity, as local horizontal transfer efficiency, and wherein, when storing the horizontal transfer efficiency for all stages, a pixel in each pixel row in a third pixel column remotest from said concentrating portion, on said image sensing surface, and a pixel in each pixel row in a fourth pixel column following the third pixel column, as an optically shielded pixel, are assumed as a third pixel and a fourth pixel, respectively, said horizontal transfer efficiency calculator detecting forward all-stage pixel data indicating the signal quantity obtained in the third pixel and backward all-stage pixel data indicating the signal quantity obtained in the fourth pixel, based on the pixel data, from pixel row to pixel row, and detecting the remainder quantity for all stages, left over untransferred in the entire stages of said horizontal transfer path, based on the forward all-stage pixel data and on the backward all-stage pixel data, to store the all-stage relationship of correspondence representing remainder quantity for all stages with respect to signal quantity, as horizontal transfer efficiency for all stages.

4. The apparatus in accordance with claim 1, wherein said horizontal transfer efficiency calculator stores a table defining the local relationship of correspondence as the local horizontal transfer efficiency and/or a table defining the all-stage relationship of correspondence as the horizontal transfer efficiency for all stages, for each of the different values of the ISO sensitivity, said horizontal transfer efficiency detector acquiring, as the horizontal transfer efficiency for image pickup, the local horizontal transfer efficiency and/or the horizontal transfer efficiency for all stages, consistent with the value of ISO sensitivity for image pickup, from said horizontal transfer efficiency calculator.

5. The apparatus in accordance with claim 1, wherein said horizontal transfer efficiency calculator stores a function defining the local relationship of correspondence as the local horizontal transfer efficiency and/or a function defining the all-stage relationship of correspondence as the horizontal transfer efficiency for all stages, for each of the different values of the ISO sensitivity, said horizontal transfer efficiency detector acquiring, as the horizontal transfer efficiency for image pickup, the local horizontal transfer efficiency and/or the horizontal transfer efficiency for all stages, consistent with the value of ISO sensitivity for image pickup, as the horizontal transfer efficiency for image pickup, from said horizontal transfer efficiency calculator.

6. The apparatus in accordance with claim 1, wherein said horizontal transfer efficiency calculator stores a function defining the local relationship of correspondence as the local horizontal transfer efficiency and/or a function defining the all-stage relationship of correspondence as the horizontal transfer efficiency for all stages, for only a reference value of ISO sensitivity, among the different values of the ISO sensitivity, said horizontal transfer efficiency detector acquiring the local horizontal transfer efficiency and/or horizontal transfer efficiency for all stages, consistent with the reference value of ISO sensitivity, from said horizontal transfer efficiency calculator, and detecting the adjusted local horizontal transfer efficiency and/or the adjusted horizontal transfer efficiency for all stages, obtained on adjusting the local horizontal transfer efficiency and/or the horizontal transfer efficiency for all stages in keeping with the value of ISO sensitivity for image pickup, as the horizontal transfer efficiency for image pickup.

7. The apparatus in accordance with claim 1, wherein, when said horizontal transfer efficiency calculator stores only the local horizontal transfer efficiency and said horizontal transfer efficiency detector detects only the local horizontal transfer efficiency, in order to correct the first pixel data in the first pixel position, among pixel data indicating the signal quantities of respective pixels, based on the digital image signal, said horizontal transfer efficiency corrector detects a first remainder quantity, left over from the first pixel data, based on the first pixel data and the local horizontal transfer efficiency, detects a second local remainder quantity, left over from the second pixel data, based on the second pixel data in the second pixel position, which is a pixel position horizontally previous to the first pixel position, among the pixel data, and on the local horizontal transfer efficiency, calculates a transfer efficiency correction quantity for the first pixel data, based on the first local remainder quantity and the second local remainder quantity, and uses the transfer efficiency correction quantity to correct the first pixel data.

8. The apparatus in accordance with claim 7 wherein, assuming that first pixel data at a first pixel position x are $S0(x)$, said horizontal transfer efficiency corrector uses the local horizontal transfer efficiency $f0(S)$ to calculate a first local remainder quantity $f0(S0(x))$, left over from the first pixel data $S0(x)$, assuming that second pixel data at a second pixel position x are $S0(x-1)$, said horizontal transfer efficiency corrector uses the local horizontal transfer efficiency $f0(S)$ to calculate a second local remainder quantity $f0(S0(x-1))$, left over from the second pixel data $S0(x-1)$, and calculates a transfer efficiency correction quantity $\Delta S(x)$ for the first pixel data, by an expression $\Delta S(x)=f0(S0(x)) f0(S0(x-1))$, based on the first local remainder quantity $f0(S0(x))$ and on the second local remainder quantity $f0(S0(x-1))$, and assuming that corrected first pixel data are $S1(x)$, said horizontal transfer efficiency corrector uses the transfer efficiency correction quantity $\Delta S(x)$ to calculate the corrected first pixel data $S1(x)$ by an expression $S1(x)=S0(x) \Delta S(x)$ to correct the first pixel data.

9. The apparatus in accordance with claim 1 wherein, when said horizontal transfer efficiency calculator stores only the horizontal transfer efficiency for all stages, and said horizontal transfer efficiency detector detects only the horizontal transfer efficiency for all stages, in order to correct the first pixel data in the first pixel position, among pixel data indicating the signal quantities of respective pixels, based on the digital image signal, said horizontal transfer efficiency corrector detects the first remainder quantity for all stages, left over from the first pixel data, based on the first pixel data and the horizontal transfer efficiency for all stages, detects the second remainder quantity for all stages, left over from the second pixel data in the second pixel position, as a pixel position horizontally previous to the first pixel position, among the respective pixel data, based on the second pixel data and the horizontal transfer efficiency for all stages, calculates a transfer efficiency correction quantity for the first pixel data, based on the first remainder quantity for all stages and the second remainder quantity for all stages, and uses the transfer efficiency correction quantity to correct the first pixel data.

10. The apparatus in accordance with claim 9 wherein, assuming that the first pixel data at the first pixel position are $S0(x)$, said horizontal transfer efficiency corrector uses the horizontal transfer efficiency for all stages $fH(S)$ to calculate a first remainder quantity for all stages $fH(S0(x))$, left over from the first pixel data $S0(x)$, assuming that the second pixel data at the second pixel position x-1 are $S0(x-1)$, said horizontal transfer efficiency corrector uses the horizontal transfer efficiency for all stages $fH(S)$ to calculate a second remainder quantity for all stages $fH(S0(x-1))$, left over from the first pixel data $S0(x-1)$, and calculates the transfer efficiency correction quantity $\Delta S(x)$ for the first pixel data, based on the first remainder quantity for all stages $fH(S0(x))$ and second remainder quantity for all stages $fH(S0(x-1))$, and assuming that the first pixel data corrected are $S1(x)$, the transfer efficiency correction quantity $\Delta S(x)$ is used to calculate by an expression $S1(x)=S0(x) \Delta S(x)$ the corrected first pixel data $S1(x)$ to correct the first pixel data.

11. The apparatus in accordance with claim 10 wherein said horizontal transfer efficiency corrector calculates the transfer efficiency correction quantity $\Delta S(x)$ for the first pixel data, based on a first remainder quantity for all stages $fH(S0(x))$ and a second remainder quantity for all stages $fH(S0(x-1))$, by an expression $\Delta S(x)=fH(S0(x))-fH(S0(x-1))$.

12. The apparatus in accordance with claim 10 wherein said horizontal transfer efficiency corrector calculates the transfer efficiency correction quantity $\Delta S(x)$ for the first pixel data, based on a first remainder quantity for all stages $fH(S0(x))$ and a second remainder quantity for all stages $fH(S0(x-1))$, by an expression $\Delta S(x)=fH(S0(x))-fH(S0(x-1))/2$, to correct the horizontal transfer efficiency for all stages with importance attached to a central portion of an image.

13. The apparatus in accordance with claim 1 wherein, when said horizontal transfer efficiency calculator stores only the horizontal transfer efficiency for all stages, and said horizontal transfer efficiency detector detects only the horizontal transfer efficiency for all stages, said horizontal transfer efficiency corrector detects the uniform horizontal transfer efficiency, which is uniform from one stage of said horizontal transfer path to another, based on the horizontal transfer efficiency for all stages, and when correcting first pixel data at the first pixel position, among pixel data indicating the signal quantities of respective pixels, based on the digital image signal, said horizontal transfer efficiency corrector detects a first uniform remainder quantity, left over from the first pixel data, based on the first pixel data and the uniform horizontal transfer efficiency, detects a second uniform remainder quantity, left over from second pixel data, among the pixel data, which are at the pixel position horizontally previous to the first pixel position, based on the second pixel data and the uniform horizontal transfer efficiency, calculates a transfer efficiency correction quantity for the first pixel data, based on the first pixel position, the first uniform remainder quantity and on the second uniform remainder quantity, and uses the transfer efficiency correction quantity to correct the first pixel data.

14. The apparatus in accordance with claim 13 wherein said horizontal transfer efficiency corrector calculates the uniform horizontal transfer efficiency $g(S)$ by an expression $g(S)=fH(S)/H$, where H is the number of pixel columns and $fH(S)$ is the horizontal transfer efficiency for all stages, uses the uniform horizontal transfer efficiency $g(S)$ to calculate a first uniform remainder quantity $g(S0(x))$, left over from first pixel data $S0(x)$ in a first pixel position x, uses the uniform horizontal transfer efficiency $g(S)$ to calculate a second uniform remainder quantity $g(S0(x-1))$, left over from second pixel data $S0(x-1)$ in a second pixel position x-1, calculates a transfer efficiency correction quantity $\Delta S(x)$ for the first pixel data $S0(x)$, by an expression $\Delta S(x)=x*g(S0(x))$ $x*g(S0(x-1))$, where x is the first pixel position, $g(S0(x))$ is a first uniform remainder quantity and $g(S0(x-1))$ is a second uniform remainder quantity, and calculates corrected first pixel data $S1(x)$ by an expression $S1(x)=S0(x)+\Delta S(x)$, where $\Delta S(x)$ is a transfer efficiency correction quantity, to correct the first pixel data.

15. The apparatus in accordance with claim 1 wherein, when storing the local horizontal transfer efficiency and the horizontal transfer efficiency for all stages, said horizontal transfer efficiency calculator detects a uniform horizontal transfer efficiency, which is uniform in each stage of a horizontal transfer path, from one value of ISO sensitivity to another, based on the local horizontal transfer efficiency and the horizontal transfer efficiency for all stages, to store the uniform horizontal transfer efficiency calculated, said horizontal transfer efficiency detector detecting the local horizontal transfer efficiency and the uniform horizontal transfer efficiency which are in keeping with the value of ISO sensitivity for image pickup.

16. The apparatus in accordance with claim 1 wherein, when said horizontal transfer efficiency calculator stores the local horizontal transfer efficiency and the horizontal transfer efficiency for all stages, and said horizontal transfer efficiency detector detects the local horizontal transfer efficiency and the horizontal transfer efficiency for all stages, said horizontal transfer efficiency corrector detects uniform horizontal transfer efficiency, which is uniform for each stage of said horizontal transfer path, based on the local horizontal transfer efficiency and the horizontal transfer efficiency for all stages which are in keeping with said value of ISO sensitivity for image pickup.

17. The apparatus in accordance with any claim 15 wherein, when correcting the first pixel data in the first pixel position, among respective pixel data, indicating signal quantities of respective pixels, based on the digital image signal, said horizontal transfer efficiency corrector detects the first local remainder quantity, left over from first pixel data, based on the first pixel data and the local horizontal transfer efficiency, detects the first uniform horizontal transfer efficiency, left over from first pixel data, based on the first pixel data and the uniform horizontal transfer efficiency, detects a first total remainder quantity, left over from the first pixel data, based on the first pixel position, first local remainder quantity and the first uniform remainder quantity, detects a second local remainder quantity, left over by the second pixel data, based on second pixel data in a second pixel position, previous to the first pixel position in the horizontal direction, among the respective pixel data, and on the local horizontal transfer efficiency, detects a second uniform remainder quantity, left over from the second pixel data, based on second pixel data and the uniform horizontal transfer efficiency, detects a second total remainder quantity, left over from the second pixel data, based on a second pixel position, second local remainder quantity and the second uniform remainder quantity, calculates a transfer efficiency correction quantity for the first pixel data, based on the first total remainder quantity and the second total remainder quantity, and uses the transfer efficiency correction quantity to correct the first pixel data.

18. The apparatus in accordance with claim 17 wherein said horizontal transfer efficiency calculator or said horizontal transfer efficiency corrector calculates a horizontal transfer efficiency $g(S)$, uniform in each stage of said horizontal transfer path, by an expression $g(S)=(fH(S) f0(S))/H$, where H is the number of pixel columns in said image sensing surface, $f0(S)$ is the local horizontal transfer efficiency and $fH(S)$ is the horizontal transfer efficiency for all stages, said horizontal transfer efficiency corrector uses the local horizontal transfer efficiency $f0(S)$ to calculate a first local remainder quantity $f0(S0(x))$, left over from first pixel data $S0(x)$ in the first pixel position x, uses the uniform horizontal transfer efficiency $g(S)$ to calculate a first uniform remainder quantity $g(S0(x))$, left over from the first pixel data $S0(x)$, calculates the first total remainder quantity $f(S0(x))$, left over from the first pixel data $S0(x)$, by an expression $f(S0(x))=f0(S0(x))+x*g(S0(x))$, where x is the first pixel position, $f(S0(x))$ is the first remainder quantity and $g(S0(x))$ is the first uniform remainder quantity, uses the local horizontal transfer efficiency $f0(S)$ to calculate the second local remainder quantity $f0(S0(x-1))$, left over from second image data $S0(x-1)$ in the second pixel position x−1, uses the uniform horizontal transfer efficiency $g(S)$ to calculate the second uniform remainder quantity $g(S0(x-1))$, left over from the second image data $S0(x-1)$, calculates the second total remainder quantity $f(S0(x-1))$, left over from the second image data $S0(x-1)$, by an expression $f(S0(x-1))$ $fH(S0(x-1))+(x-1)*g(S0(x-1))$, where x−1 is the second pixel position, $f0(S0(x-1))$ is the second local remainder quantity and $g(S0(x-1))$ is the second uniform remainder quantity, calculates the transfer efficiency correction quantity $\Delta S(x)$ for the first pixel data $S0(x)$, by an expression $\Delta S(x)=f(S0(x))$ $f(S0(x-1))$, where $f(S0(x))$ is the first total remainder quantity and $f(S0(x-1))$ is the second total remainder quantity, and uses the transfer efficiency correction quantity $\Delta S(x)$ to calculate corrected first pixel data $S1(x)$ by an expression $S1(x)=S0(x)+\Delta S(x)$ to correct the first pixel data.

19. The apparatus in accordance with claim 18 wherein said horizontal transfer efficiency corrector calculates the transfer efficiency correction quantity $\Delta S(x)$ for the first pixel data $S0(x)$ by an expression $\Delta S(x)=f(S0(x))-f(S0(x-1))$, where $f(S0(x))$ is the first total remainder quantity and $f(S0(x-1))$ is the second total remainder quantity.

20. The apparatus in accordance with claim 18 wherein said horizontal transfer efficiency corrector calculates the transfer efficiency correction quantity $\Delta S(x)$ for the first pixel data $S0(x)$ by an expression $\Delta S(x)=f(S0(x))-f(S0(x-1))/2$, where $f(S0(x))$ is the first total remainder quantity and $f(S0(x-1))$ is the second total remainder quantity, to correct the horizontal transfer efficiency for all stages with importance attached to the central portion of the image.

21. An image correcting method comprising:

an image sensing step of photo-electrically converting incident light to generate signal charges on an image sensing surface, on which a plurality of pixels are arrayed in a row direction and in a column direction, shifting the signal charges of each row transferred from said image sensing surface in the horizontal direction on a horizontal transfer path, concentrating the signal charges in a concentrating portion to transfer the charges to an output circuit, converting the signal charges, transferred to said output circuit, into an electric signal and outputting the electric signal;

a signal processing step of analog-signal processing and analog-to-digital converting the electric signal to produce a digital image signal, and of digital-signal processing the digital image signal; and a step of setting, for main shooting, a predetermined value of ISO sensitivity, among a plurality of different values of the ISO sensitivity, as value of ISO sensitivity for image pickup, said image sensing step photographing a field in keeping with the value of ISO sensitivity for image pickup;

said signal processing step includes:

a horizontal transfer efficiency calculation substep of calculating in advance the horizontal transfer efficiency information, representing the horizontal transfer efficiency for signal charge transfer in said image sensing step, in keeping with predetermined one of the different values of the ISO sensitivity, and storing the horizontal transfer efficiency information calculated;

a horizontal transfer efficiency detection substep of acquiring the horizontal transfer efficiency information from said horizontal transfer efficiency calculation substep and of detecting the horizontal transfer efficiency for image pickup, consistent with the value of ISO sensitivity for image pickup, based on the horizontal transfer efficiency information; and a horizontal transfer efficiency correction substep of correcting the digital image signal for compensating the horizontal transfer efficiency for image pickup, and wherein said horizontal transfer efficiency calculation substep calculates, as the horizontal transfer efficiency information, the local horizontal transfer efficiency for signal charge transfer in the concentrating portion and/or the horizontal transfer efficiency for all stages for signal charge transfer in the horizontal transfer path.

22. The method in accordance with claim 21, wherein storage in said horizontal transfer efficiency calculation substep is carried out in advance in a course of a manufacturing process such as shipping of an image sensor having said image sensing step or adjustment for image sensing operations for said method.

23. The method in accordance with claim 21, wherein, when calculating the local horizontal transfer efficiency, a pixel in each pixel row in a first pixel column closest to the concentrating portion and a pixel in each pixel row in a second pixel column following the first pixel column, on the image sensing surface, are assumed as a first pixel and a second pixel, respectively, said horizontal transfer efficiency calculation substep detecting, among pixel data indicating signal quantities of respective pixels based on the digital image signal, forward local pixel data indicating the signal quantity obtained in the first pixel and backward local pixel data indicating the signal quantity obtained in the second pixel, from pixel row to pixel row, detecting the local remainder quantity, left over untransferred in the concentrating portion, based on the forward local pixel data and on the backward local pixel data, to store the local relationship of correspondence representing the local remainder quantity with respect to the signal quantity, as local horizontal transfer efficiency, and wherein, when storing the horizontal transfer efficiency for all stages, a pixel in each pixel row in a third pixel column remotest from the concentrating portion, on the image sensing surface, and a pixel in each pixel row in a fourth pixel column following the third pixel column, as an optically shielded pixel, are assumed as a third pixel and a fourth pixel, respectively, said horizontal transfer efficiency calculation substep detecting forward all-stage pixel data indicating the signal quantity obtained in the third pixel and backward all-stage pixel data indicating the signal quantity obtained in the fourth pixel, based on the pixel data, from pixel row to pixel row, and detecting the remainder quantity for all stages, left over untransferred in the entire stages of the horizontal transfer path, based on the forward all-stage pixel data and on the backward all-stage pixel data, to store the all-stage relationship of correspondence representing remainder quantity for all stages with respect to signal quantity, as horizontal transfer efficiency for all stages.

24. The method in accordance with claim 21, wherein said horizontal transfer efficiency calculation substep stores a table defining the local relationship of correspondence as the local horizontal transfer efficiency and/or a table defining the all-stage relationship of correspondence as the horizontal transfer efficiency for all stages, for each of the different values of the ISO sensitivity, said horizontal transfer efficiency detection substep acquiring, as the horizontal transfer efficiency for image pickup, the local horizontal transfer efficiency and/or the horizontal transfer efficiency for all stages, consistent with the value of ISO sensitivity for image pickup, from said horizontal transfer efficiency calculation substep.

25. The method in accordance with claim 21, wherein said horizontal transfer efficiency calculation substep stores a function defining the local relationship of correspondence as the local horizontal transfer efficiency and/or a function defining the all-stage relationship of correspondence as the horizontal transfer efficiency for all stages, for each of the different values of the ISO sensitivity, said horizontal transfer efficiency detection substep acquiring, as the horizontal transfer efficiency for image pickup, the local horizontal transfer efficiency and/or the horizontal transfer efficiency for all stages, consistent with the value of ISO sensitivity for image pickup, from said horizontal transfer efficiency calculation substep.

26. The method in accordance with claim 21, wherein said horizontal transfer efficiency calculation substep stores a function defining the local relationship of correspondence as the local horizontal transfer efficiency and/or a function defining the all-stage relationship of correspondence as the horizontal transfer efficiency for all stages, for only a reference sensitivity, among the different values of the ISO sensitivity, said horizontal transfer efficiency detection substep acquiring the local horizontal transfer efficiency and/or horizontal transfer efficiency for all stages, consistent with the reference value of ISO sensitivity, from said horizontal transfer efficiency calculation substep, and detecting adjusted local horizontal transfer efficiency and/or adjusted horizontal transfer efficiency for all stages, obtained on adjusting the local horizontal transfer efficiency and/or horizontal transfer efficiency for all stages in keeping with the value of ISO sensitivity for image pickup, as the horizontal transfer efficiency for image pickup.

27. The method in accordance with claim 21 wherein, when said horizontal transfer efficiency calculation substep stores only the local horizontal transfer efficiency and said horizontal transfer efficiency detection substep detects only the local horizontal transfer efficiency, in order to correct the first pixel data in the first pixel position, among pixel data indicating the signal quantities of respective pixels, based on the digital image signal, said horizontal transfer efficiency correction substep detects a first remainder quantity, left over from the first pixel data, based on the first pixel data and the local horizontal transfer efficiency, detects a second local remainder quantity, left over from the second pixel data, based on the second pixel data in the second pixel position, which is a pixel position horizontally previous to the first pixel position, among the pixel data, and on the local horizontal transfer efficiency, calculates a transfer efficiency correction quantity for the first pixel data, based on the first local remainder quantity and the second local remainder quantity, and uses the transfer efficiency correction quantity to correct the first pixel data.

28. The method in accordance with claim 27 wherein, assuming that first pixel data at a first pixel position x are $S0(x)$, said horizontal transfer efficiency correction substep uses the local horizontal transfer efficiency $f0(S)$ to calculate a first local remainder quantity $f0(S0(x))$, left over from the first pixel data $S0(x)$, assuming that second pixel data at a second pixel position x are $S0(x-1)$, said horizontal transfer efficiency correction substep uses the local horizontal transfer efficiency $f0(S)$ to calculate a second local remainder quantity $f0(S0(x-1))$, left over from the second pixel data $S0(x-1)$, and calculates a transfer efficiency correction quantity $\Delta S(x)$ for the first pixel data, by an expression $\Delta S(x)=f0(S0(x))-f0(S0(x-1))$, based on the first local remainder quantity $f0(S0(x))$ and on the second local remainder quantity $f0(S0(x-1))$, and assuming that corrected first pixel data are $S1(x)$, said horizontal transfer efficiency correction substep uses the transfer efficiency correction quantity $\Delta S(x)$ to calculate the corrected first pixel data $S1(x)$ by an expression $S1(x)=S0(x)+\Delta S(x)$ to correct the first pixel data.

29. The method in accordance with claim 21 wherein, when said horizontal transfer efficiency calculation substep stores only the horizontal transfer efficiency for all stages and said horizontal transfer efficiency detection substep detects only the horizontal transfer efficiency for all stages, in order to correct the first pixel data in the first pixel position, among pixel data indicating the signal quantities of respective pixels, based on the digital image signal, said horizontal transfer efficiency correction substep detects the first remainder quantity for all stages, left over from the first pixel data, based on the first pixel data and the horizontal transfer efficiency for all stages, detects the second remainder quantity for all stages, left over from the second pixel data in the second pixel position, as a pixel position horizontally previous to the first pixel position, among the respective pixel data, based on the second pixel data and the horizontal transfer efficiency for all stages, calculates a transfer efficiency correction quantity for the first pixel data, based on the first remainder quantity for all stages and the second remainder quantity for all stages, and uses the transfer efficiency correction quantity to correct the first pixel data.

30. The method in accordance with claim 29 wherein, assuming that the first pixel data at the first pixel position are $S0(x)$, said horizontal transfer efficiency correction substep uses the horizontal transfer efficiency for all stages $fH(S)$ to calculate a first remainder quantity for all stages $fH(S0(x))$, left over from the first pixel data $S0(x)$, assuming that the second pixel data at the second pixel position x−1 are $S0(x-1)$, said horizontal transfer efficiency correction sub step uses the horizontal transfer efficiency for all stages $fH(S)$ to calculate a second remainder quantity for all stages $fH(S0(x-1))$, left over from the first pixel data $S0(x-1)$, calculates the transfer efficiency correction quantity $\Delta S(x)$ for the first pixel data, based on the first remainder quantity for all stages $fH(S0(x))$ and second remainder quantity for all stages $fH(S0(x-1))$, and assuming that the first pixel data corrected are $S1(x)$, the transfer efficiency correction quantity $\Delta S(x)$ is used to calculate by an expression $S1(x)=S0(x)+\Delta S(x)$ the corrected first pixel data $S1(x)$ to correct the first pixel data.

31. The method in accordance with claim 30 wherein said horizontal transfer efficiency correction substep calculates the transfer efficiency correction quantity $\Delta S(x)$ for the first pixel data, based on a first remainder quantity for all stages $fH(S0(x))$ and a second remainder quantity for all stages $fH(S0(x-1))$, by an expression $\Delta S(x)=fH(S0(x))-fH(S0(x-1))$.

32. The method in accordance with claim 30 wherein said horizontal transfer efficiency correction substep calculates the transfer efficiency correction quantity $\Delta S(x)$ for the first pixel data, based on a first remainder quantity for all stages $fH(S0(x))$ and a second remainder quantity for all stages $fH(S0(x-1))$, by an expression $\Delta S(x)=fH(S0(x))-fH(S0(x-1))/2$, to correct the horizontal transfer efficiency for all stages with importance attached to the central portion of an image.

33. The method in accordance with claim 21 wherein, when said horizontal transfer efficiency calculation substep stores only the horizontal transfer efficiency for all stages, and said horizontal transfer efficiency detection substep detects only the horizontal transfer efficiency for all stages, said horizontal transfer efficiency correction substep detects uniform horizontal transfer efficiency, which is uniform from one stage of the horizontal transfer path to the next, based on the horizontal transfer efficiency for all stages, and when correcting first pixel data at the first pixel position, among pixel data indicating the signal quantities of respective pixels, based on the digital image signal, said horizontal transfer efficiency correction substep detects a first uniform remainder quantity, left over from the first pixel data, based on the first pixel data and the uniform horizontal transfer efficiency, detects a second uniform remainder quantity, left over from second pixel data, among the pixel data, which is at the pixel position horizontally previous to the first pixel position, based on the second pixel data and the uniform horizontal transfer efficiency, calculates a transfer efficiency correction quantity for the first pixel data, based on the first pixel position, the first uniform remainder quantity and on the second uniform remainder quantity, and uses the transfer efficiency correction quantity to correct the first pixel data.

34. The method in accordance with claim 33 wherein said horizontal transfer efficiency correction substep calculates the uniform horizontal transfer efficiency $g(S)$ by an expression $g(S)=fH(S)/H$, where H is the number of pixel columns and $fH(S)$ is the horizontal transfer efficiency for all stages, uses the uniform horizontal transfer efficiency $g(S)$ to calculate a first uniform remainder quantity $g(S0(x))$, left over from first pixel data $S0(x)$ in a first pixel position x, uses the uniform horizontal transfer efficiency g(S) to calculate a second uniform remainder quantity g(S0($x-1$)), left over from second pixel data S0($x-1$) in a second pixel position x−1, calculates a transfer efficiency correction quantity ΔS(x) for the first pixel data S0($x$), by an expression ΔS(x)=x*g(S0($x$))−x*g(S0($x-1$)), where x is the first pixel position, g(S0($x$)) is a first uniform remainder quantity and g(S0($x-1$)) is a second uniform remainder quantity, and calculates corrected first pixel data S1($x$) by an expression S1($x$) S0($x$) ΔS(x), where ΔS(x) is a transfer efficiency correction quantity, to correct the first pixel data.

35. The method in accordance with claim 21 wherein, when storing the local horizontal transfer efficiency and the horizontal transfer efficiency for all stages, said horizontal transfer efficiency calculation substep detects a uniform horizontal transfer efficiency, which is uniform in each step of a horizontal transfer path, from one value of ISO sensitivity to another, based on the local horizontal transfer efficiency and the horizontal transfer efficiency for all stages, to store the uniform horizontal transfer efficiency calculated, said horizontal transfer efficiency detection substep detecting the local horizontal transfer efficiency and the uniform horizontal transfer efficiency which are in keeping with the value of ISO sensitivity for image pickup.

36. The method in accordance with claim 21 wherein, when said horizontal transfer efficiency calculation substep stores the local horizontal transfer efficiency and the horizontal transfer efficiency for all stages, and said horizontal transfer efficiency detection substep detects the local horizontal transfer efficiency and the horizontal transfer efficiency for all stages, said horizontal transfer efficiency correction substep detects uniform horizontal transfer efficiency, which is uniform for each stage of the horizontal transfer path, based on the local horizontal transfer efficiency and the horizontal transfer efficiency for all stages which are in keeping with the value of ISO sensitivity for image pickup.

37. The method in accordance with any claim 35 wherein, when correcting the first pixel data in the first pixel position, among respective pixel data, indicating signal quantities of respective pixels, based on the digital image signal, said horizontal transfer efficiency correction substep detects the first local remainder quantity, left over from first pixel data, based on the first pixel data and the local horizontal transfer efficiency, detects the first uniform horizontal transfer efficiency, left over from first pixel data, based on the first pixel data and the uniform horizontal transfer efficiency, detects a first total remainder quantity, left over from the first pixel data, based on the first pixel position, first local remainder quantity and the first uniform remainder quantity, detects a second local remainder quantity, left over by the second pixel data, based on second pixel data in a second pixel position, previous to the first pixel position in the horizontal direction, among the respective pixel data, and on the local horizontal transfer efficiency, detects a second uniform remainder quantity, left over from the second pixel data, based on second pixel data and the uniform horizontal transfer efficiency, detects a second total remainder quantity, left over from the second pixel data, based on a second pixel position, second local remainder quantity and the second uniform remainder quantity, calculates a transfer efficiency correction quantity for the first pixel data, based on the first total remainder quantity and the second total remainder quantity, and uses the transfer efficiency correction quantity to correct the first pixel data.

38. The method in accordance with claim 37 wherein said horizontal transfer efficiency calculation substep or said horizontal transfer efficiency correction substep calculates a horizontal transfer efficiency g(S), uniform in each stage of the horizontal transfer path, by an expression g(S)=(fH(S)−f0(S))/H, where H is the number of pixel columns in the image sensing surface, f0(S) is the local horizontal transfer efficiency and fH(S) is the horizontal transfer efficiency for all stages, said horizontal transfer efficiency correction substep uses the local horizontal transfer efficiency f0(S) to calculate a first local remainder quantity f0(S0($x$)), left over from first pixel data S0($x$) in the first pixel position x, uses the uniform horizontal transfer efficiency g(S) to calculate a first uniform remainder quantity g(S0($x$)), left over from the first pixel data S0($x$), calculates the first total remainder quantity f(S0($x$)), left over from the first pixel data S0($x$), by an expression f(S0($x$))=f0(S0($x$))+x*g(S0($x$)), where x is the first pixel position, f(S0($x$)) is the first remainder quantity and g(S0($x$)) is the first uniform remainder quantity, uses the local horizontal transfer efficiency f0(S) to calculate the second local remainder quantity f0(S0($x-1$)), left over from second image data S0($x-1$) in the second pixel position x−1, uses the uniform horizontal transfer efficiency g(S) to calculate the second uniform remainder quantity g(S0($x-1$)), left over from the second image data S0($x-1$), calculates the second total remainder quantity f(S0($x-1$)), left over from the second image data S0($x-1$), by an expression f(S0($x-1$))=f0(S0($x-1$))+(x−1)*g(S0($x-1$)), where x−1 is the second pixel position, f0(S0($x-1$)) is the second local remainder quantity and g(S0($x-1$)) is the second uniform remainder quantity, calculates the transfer efficiency correction quantity ΔS(x) for the first pixel data S0($x$), by an expression ΔS(x)=f(S0($x$))−f(S0($x-1$)), where f(S0($x$)) is the first total remainder quantity and f(S0($x-1$)) is the second total remainder quantity, and uses the transfer efficiency correction quantity ΔS(x) to calculate corrected first pixel data S1($x$) by an expression S1($x$)=S0($x$) ΔS(x) to correct the first pixel data.

39. The method in accordance with claim 38 wherein said horizontal transfer efficiency correction substep calculates the transfer efficiency correction quantity ΔS(x) for the first pixel data S0($x$) by an expression ΔS(x)=f(S0($x$))−f(S0($x-1$)), where f(S0($x$)) is the first total remainder quantity and f(S0($x-1$)) is the second total remainder quantity.

40. The method in accordance with claim 38 wherein said horizontal transfer efficiency correction substep calculates the transfer efficiency correction quantity ΔS(x) for the first pixel data S0($x$) by an expression ΔS(x)=f(S0($x$))−f(S0($x-1$)))/2, where f(S0($x$)) is the first total remainder quantity and f(S0($x-1$)) is the second total remainder quantity, to correct the horizontal transfer efficiency for all stages with importance attached to the central portion of the image.

* * * * *